(12) United States Patent
Sawa et al.

(10) Patent No.: US 7,174,985 B2
(45) Date of Patent: Feb. 13, 2007

(54) EXTERIOR AIRBAG DEVICE

(75) Inventors: Tomohiro Sawa, Shiga (JP); Tadahiro Igawa, Shiga (JP)

(73) Assignee: Takata Corporation (JP)

( * ) Notice: Subject to any disclaimer, the term of this patent is extended or adjusted under 35 U.S.C. 154(b) by 274 days.

(21) Appl. No.: 10/274,735

(22) Filed: Oct. 21, 2002

(65) Prior Publication Data
US 2003/0075373 A1    Apr. 24, 2003

(30) Foreign Application Priority Data
Oct. 22, 2001  (JP) .............................. 2001-323709
Dec. 3, 2001   (JP) .............................. 2001-368931

(51) Int. Cl.
*B60R 21/34*   (2006.01)

(52) U.S. Cl. ............... 180/274; 280/730.1; 296/193.11

(58) Field of Classification Search ............. 280/728.1, 280/730.1, 743.1, 751, 762; 180/274; 296/95.1, 296/193.11
See application file for complete search history.

(56) References Cited

U.S. PATENT DOCUMENTS

| 3,656,790 | A | * | 4/1972 | Truesdell ..................... 293/107 |
| 3,708,194 | A | * | 1/1973 | Amit ............................... 293/1 |
| 4,549,471 | A | * | 10/1985 | Kochy et al. ................. 454/127 |
| 5,437,471 | A | * | 8/1995 | Yoshida et al. ........... 280/730.2 |
| 5,725,265 | A | * | 3/1998 | Baber .......................... 293/107 |
| 5,732,785 | A | * | 3/1998 | Ran et al. .................... 180/271 |
| 5,959,552 | A | * | 9/1999 | Cho ............................ 340/903 |
| 6,106,038 | A | * | 8/2000 | Dreher ......................... 293/118 |
| 6,182,782 | B1 | * | 2/2001 | Matsuura et al. ........... 180/274 |
| 6,227,325 | B1 | * | 5/2001 | Shah ........................... 180/274 |
| 6,450,556 | B1 | * | 9/2002 | Jacobs ......................... 293/107 |
| 6,467,563 | B1 | * | 10/2002 | Ryan et al. .................. 180/274 |
| 6,474,679 | B2 | * | 11/2002 | Miyasaka et al. ........ 280/730.1 |
| 6,637,788 | B1 | * | 10/2003 | Zollner et al. .............. 293/107 |

(Continued)

FOREIGN PATENT DOCUMENTS

EP              0 816 178 A1        7/1998

(Continued)

OTHER PUBLICATIONS

European Search Report for EP 02 02 2277 dated Oct. 28, 2003.

*Primary Examiner*—Paul N. Dickson
*Assistant Examiner*—Toan C. To
(74) *Attorney, Agent, or Firm*—Fitch, Even, Tabin & Flannery

(57) ABSTRACT

An external airbag device is provided which can smoothly deploy its airbag with being caught by neither a rear edge of a hood nor a windshield wiper. A lid 8 is allowed to be displaced relative to a retainer 2 in the vertical direction because hooks 10 are movable in the vertical direction within apertures 16. When an airbag 4 is inflated, the lid 8 is lifted and is torn to open outwardly by the inflation pressure of the airbag 4 to create flaps 28, 30. The flap 28 which pivoted outwardly toward the front of the motor vehicle is laid on an outer surface of a rear edge portion of a hood 18. The flap 30 which pivoted outwardly toward the rear of the motor vehicle is laid on a cowl top 22 below the windshield 20 to cover windshield wipers 26.

15 Claims, 18 Drawing Sheets

U.S. PATENT DOCUMENTS 6,827,170 B2 * 12/2004 Hamada et al. ............ 180/274

FOREIGN PATENT DOCUMENTS

| | | |
|---|---|---|
| EP | 0 937 612 A2 | 8/1999 |
| EP | 0 937 612 A3 | 3/2000 |
| FR | 2771980 | 6/1999 |
| JP | 6239198 | 8/1994 |
| JP | 7108902 | 4/1995 |
| JP | 7108903 | 4/1995 |
| JP | 7125609 | 5/1995 |
| JP | 7156749 | 6/1995 |
| JP | 7232615 | 9/1995 |
| JP | 7237522 | 9/1995 |
| JP | 7246908 | 9/1995 |
| JP | 7329705 | 12/1995 |
| JP | 8034312 | 2/1996 |
| JP | 8072666 | 3/1996 |
| JP | 8216826 | 8/1996 |
| JP | 8230610 | 9/1996 |
| JP | 8276817 | 10/1996 |
| JP | 10315908 | 12/1998 |
| JP | 2000108824 | 4/2000 |
| JP | 2000118337 | 4/2000 |
| JP | 2000168473 | 6/2000 |
| JP | 2000264146 | 9/2000 |
| JP | 02003104144 A * | 10/2001 |

* cited by examiner

Fig. 21
(a)
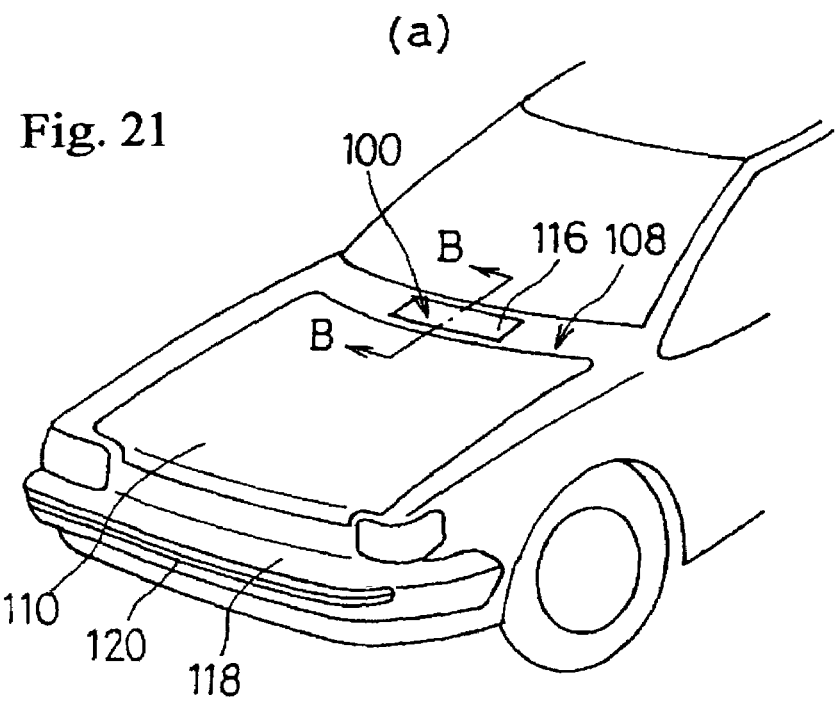
(b)
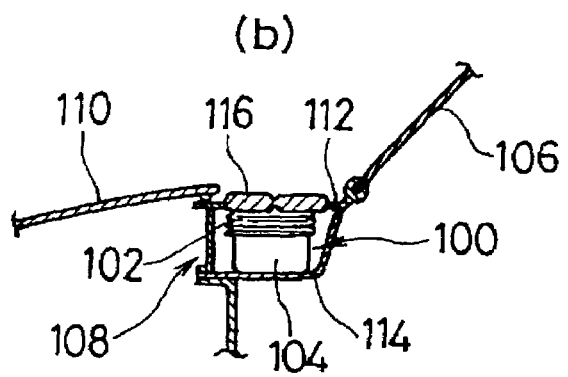
(c)
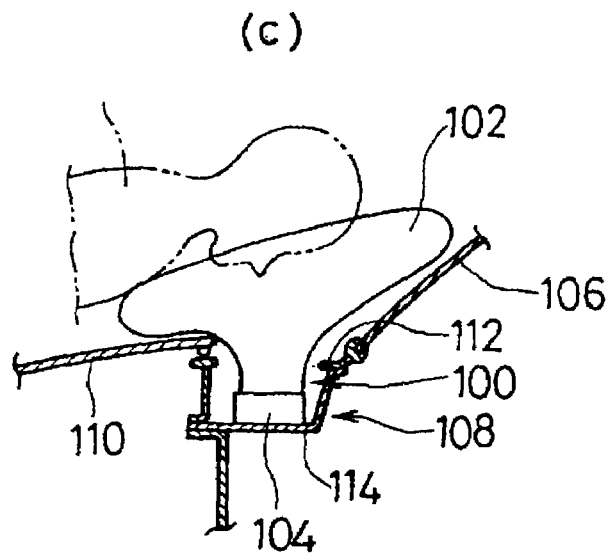

EXTERIOR AIRBAG DEVICE

FIELD OF THE INVENTION

The present invention relates to an exterior airbag device of a motor vehicle for preventing a pedestrian, a rider of a bicycle, or a rider of a motorcycle (hereinafter generally referred to as "pedestrian") from directly colliding with a high rigid portion such as a lower portion of the windshield, a rear portion of the front hood, or a pillar of the motor vehicle, thereby protecting the pedestrian in the event of a collision between the motor vehicle and the pedestrian, the bicycle, or the motorcycle during the running of the motor vehicle.

BACKGROUND OF THE INVENTION

As a motor vehicle collides with a pedestrian, a bicycle, or a motorcycle during the running of the motor vehicle, the pedestrian, a rider of the bicycle, or a rider of the motorcycle, may be hit at his/her lower body with a front body of the motor vehicle so as to bound onto a hood covering the top of the vehicle front body and may secondly collides with a high rigid portion such as a lower portion of the windshield, a rear portion of the front hood, or a pillar.

Japanese Unexamined Utility Model Publication No. H06-74533 discloses an exterior airbag device as a pedestrian protective airbag system of which an airbag is deployed from a rear portion of a hood along an outer surface of the windshield, thereby preventing a pedestrian from directly colliding with a windshield of a motor vehicle. Hereinafter, referring to FIGS. 21($a$)–21($c$), the exterior airbag device of this publication will be described.

FIG. 21($a$) is a perspective view of a front body of the motor vehicle equipped with the exterior airbag device, FIG. 21($b$), 21($c$) are sectional views taken along the line B—B of FIG. 21($a$). It should be noted that FIG. 21($b$) shows a normal state (without a collision between the motor vehicle and a pedestrian) of the exterior airbag device, and FIG. 21($c$) shows a state with a deployed airbag of the exterior airbag device.

The exterior airbag device 100 comprises: an airbag 102, a gas generator (inflator) 104 for inflating the airbag 102. The gas generator 104 is disposed in a cowl top 108, having a container shape, located beneath a windshield (front windscreen glass) 106 of the motor vehicle. The airbag 102 is normally folded and accommodated in the cowl top 108. The cowl top 108 is adjacent to the rear end, as seen in the longitudinal direction of the vehicle body, of a hood (front hood) 110 covering the top of the vehicle front body.

The cowl top 108 comprises: a cowl top outer panel 112 exposed on the top of the vehicle front body, a cowl top inner panel 114 composing the bottom of the cowl top 108. The cowl top outer panel 112 is provided with an opening for allowing the airbag 102 to be deployed over the top of the vehicle front body. The opening is positioned above the airbag 102 accommodated in the cowl top 108. In the normal state, a lid 116 is attached to close the opening.

The front end of the motor vehicle such as a front bumper 118 is provided with a contact/impact detection sensor 120 for sensing a collision between the motor vehicle during running and a pedestrian, a bicycle, or a motorcycle. In the exterior airbag device 100 is structured so that, as the contact/impact detection sensor 120 detects the collision, the gas generator 104 is triggered to generate gas into the airbag 102, thereby inflating the airbag 102.

As the motor vehicle equipped with the exterior airbag device 100 collides with a pedestrian, a bicycle, or a motorcycle, the contact/impact detection sensor 120 detects the collision, gas is introduced from the gas generator 104 to the inside of the airbag 102, thereby inflating the airbag 102. Then, the airbag 102 pushes to open the lid 116 attached to the opening of the cowl top 108 to expand over the top of the vehicle front body and is deployed from the rear portion of the hood 110 along the outer surface of the windshield 106 as shown in FIG. 21($c$).

Therefore, even if the pedestrian, who is hit onto the hood 110 as a result of the collision with the motor vehicle, is about to plunge into the windshield 106, the airbag 102 receives the pedestrian and thus prevents the pedestrian from directly colliding with a high rigid portion such as a lower portion of the windshield 106, a rear portion of the hood 110, or the pillar.

In the exterior airbag device 100, the airbag 102 may be caught by a rear edge of the hood or windshield wipers and thus damaged when the airbag 102 is deployed to expand over an area including the rear portion of the hood 110 and the outer surface of the windshield 106.

SUMMARY OF THE INVENTION

It is an object of the present invention to provide an exterior airbag device which can smoothly deploy its airbag without being caught by an edge portion and/or projecting article of a vehicle body such as a rear edge of a hood or windshield wipers.

An exterior airbag device of the present invention comprises: an airbag which is deployable to expand over an area from a rear portion of a hood to an outer surface of a windshield of a motor vehicle; a casing accommodating the airbag; a lid covering the casing; and a gas generator for inflating the airbag, wherein when the airbag is inflated, the lid is pushed up by the airbag to open outside, and is characterized in that the lid which opened outside covers at least one of the rear end of the hood and the windshield wipers.

In the exterior airbag device mentioned above, the lid which opened outside covers the rear edge of the hood and the windshield wipers during the deployment of the airbag, whereby the airbag can be smoothly inflated with being caught by neither the rear edge nor the windshield wipers.

In the exterior airbag device, it is preferable that the lid is located at a level lower than the outer surface of the motor vehicle, and the lid is attached to said casing to allow the upward movement of the lid in the vertical direction relative to the casing, so that when the lid is pushed up by the airbag being inflated, the lid moves upward and then opens.

According to the arrangement mentioned above, the external airbag device is not conspicuous so that the motor vehicle has good appearance for the upper surface of the front body of the motor vehicle. In addition, the lid is hardly exposed to direct sunlight and strong winds and rains, thereby improving the durability of the lid. Moreover, the lid is lifted by the airbag being inflated and, after that, is torn to open, whereby the opening movement of the lid is extremely smooth.

An exterior airbag device of the present invention comprises: an airbag which is deployable to expand over an area from a rear portion of a hood to an outer surface of a windshield of a motor vehicle; a casing accommodating the airbag; a lid covering the casing; and a gas generator for inflating the airbag, wherein when the airbag is inflated, the lid is pushed up by the airbag to open outside, and is characterized in that the lid covers edge portions and projections of the motor vehicle, which exist within the expansion area of the airbag, during the deployment of the airbag.

In the exterior airbag device mentioned above, the lid covers edge portions and projections of the motor vehicle, which exist within the expansion area of the airbag, during the deployment of the airbag, thereby securing the airbag to be smoothly inflated without being caught by such a thing.

BRIEF DESCRIPTION OF THE DRAWINGS

FIGS. 21(a)–21(c) are explanatory views of a conventional exterior airbag device.

DETAILED DESCRIPTION OF THE PREFERRED EMBODIMENTS

Figure 1:
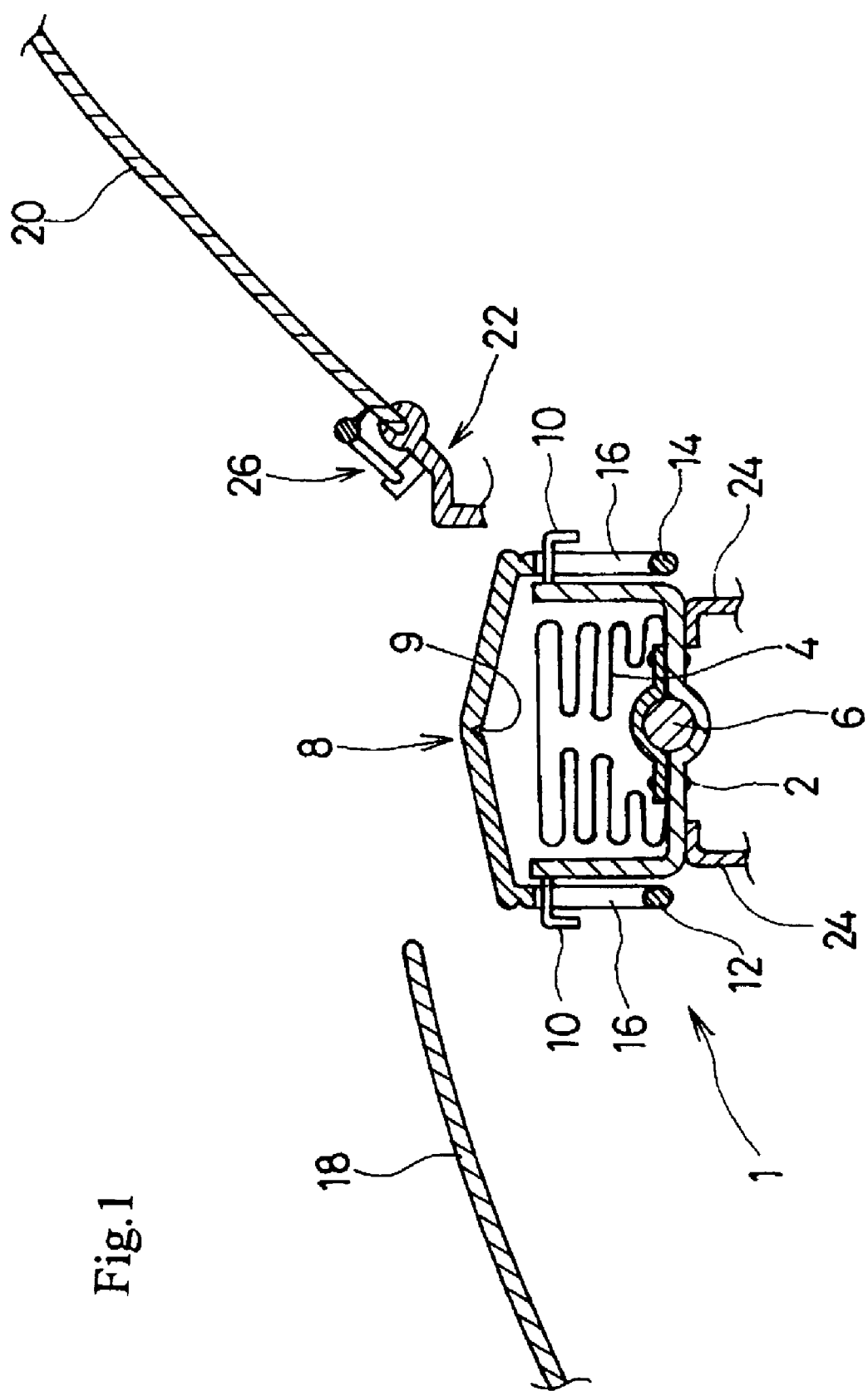
FIG. 1 is a vertical sectional view of a front body of a motor vehicle equipped with an exterior airbag device according to an embodiment of the present invention in the normal state.
Figure 2:
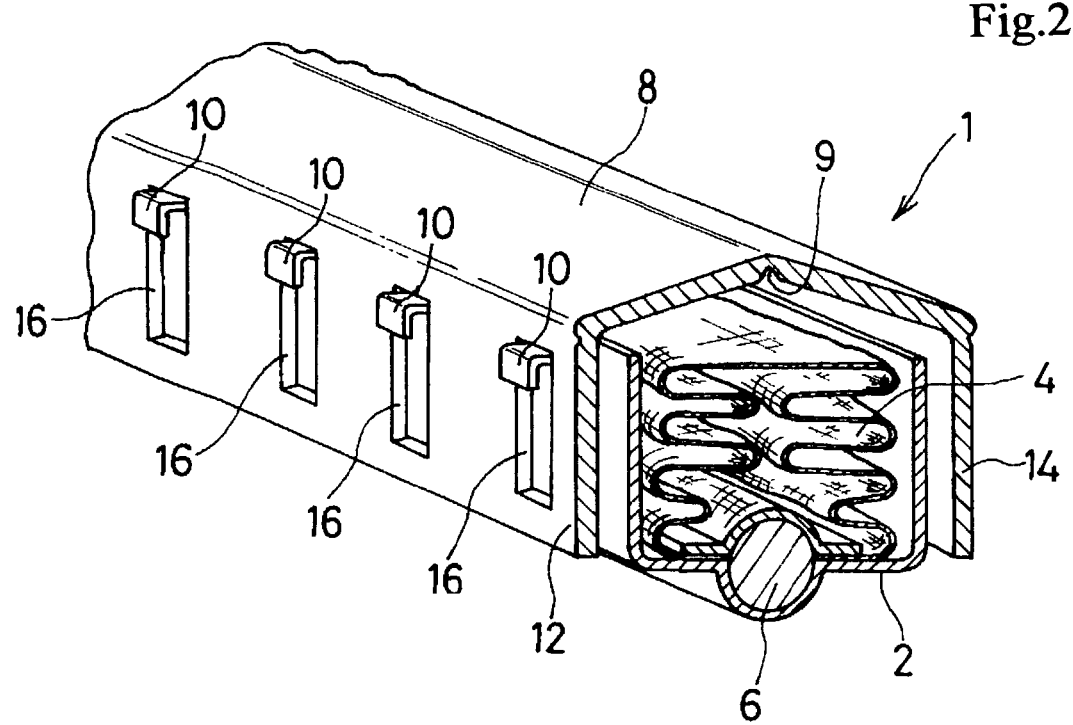
FIG. 2 is a perspective view of main parts of the exterior airbag device of FIG. 1.
Figure 3:
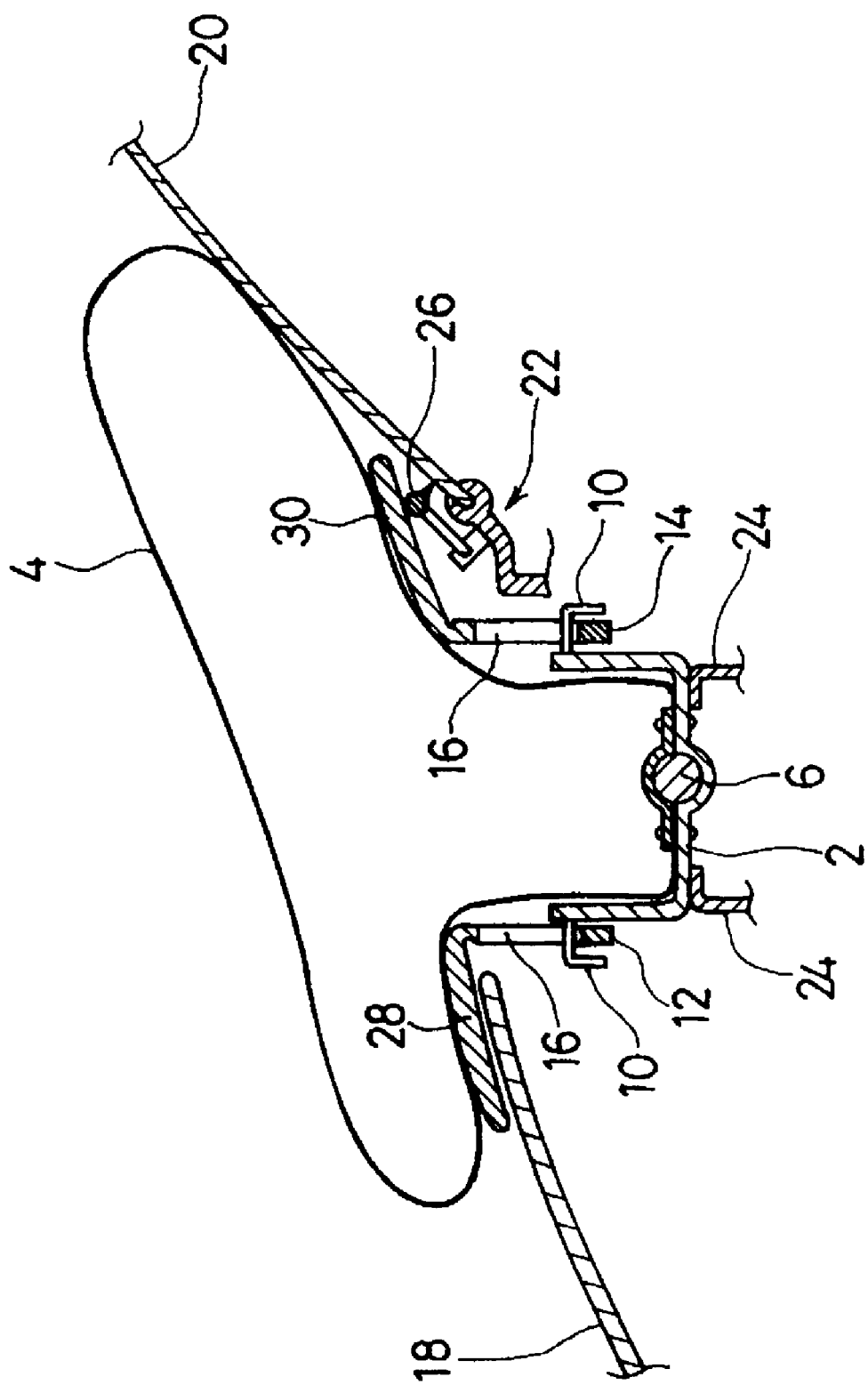
FIG. 3 is a vertical sectional view of the front body of the motor vehicle in a state where an airbag of the exterior airbag device of FIG. 1 is deployed.

Hereinafter, embodiments of the present invention will be described with reference to the attached drawings. FIG. 1 is a vertical sectional view of a front body of a motor vehicle equipped with an exterior airbag device according to an embodiment of the present invention in the normal state, FIG. 2 is a perspective view of main parts of the exterior airbag device, and FIG. 3 is a vertical sectional view of the front body of the motor vehicle in a state where an airbag of the exterior airbag device is deployed. In the following description, the term "vertical direction" means the up and down direction of the motor vehicle, that is, the up and down direction in FIGS. 1 through 3, the term "longitudinal direction" means the fore and aft direction of the motor vehicle, that is, the left and right direction in FIGS. 1 through 3, and the term "lateral direction" means the width direction of the motor vehicle, that is, a direction perpendicular to the surfaces of sheets of paper printed with FIGS. 1 through 3.

The exterior airbag device 1 comprises: a container-line retainer (airbag holding member) 2 which has an open top, and an airbag 4 which is folded and accommodated in the retainer 2, a gas generator 6 for inflating the airbag 4, and a lid (cover member) 8 for covering the open top of the retainer 2.

In this embodiment, the retainer 2 is a container-like member having a configuration like a rectangular parallelepiped which is long in the width direction of the vehicle body and short in the longitudinal direction of the vehicle body. The lid 8 is provided with a tear line 9 composed of a groove which is formed in the back of the lid 8 about the middle in the longitudinal direction of the vehicle body to extend in the width direction of the vehicle body. As a pressure exceeding a predetermined value is exerted on the back of the lid 8 because of the deployment pressure of the airbag 4 during the airbag 4 is inflated, the lid 8 is torn along the tear line 9 and opened outwardly.

In this embodiment, the lid 8 has an inverted V-like sectional profile (in section along a vertical plane extending in the vehicle longitudinal direction) in which a portion about the middle in the longitudinal direction of the vehicle body is the highest portion and the sides are downslopes toward the front and rear of the vehicle body, respectively. Therefore, stress applied to the back of the lid 8 by the airbag 4 being inflated is concentrated to the middle of the lid 8 in the vehicle longitudinal direction, i.e. to the tear line 9, so the lid 8 is easily torn along the tear line 9.

The retainer 2 is provided with a plurality of hooks 10 with downward claw-like ends which are formed on upper portions of the both side walls, facing toward the front of the motor vehicle and toward the rear of the motor vehicle, of the retainer 2. These hooks 10 are arranged along the respective upper edges of the side walls, facing toward the front of the motor vehicle and toward the rear of the motor vehicle, of the retainer 2.

A pair of walls 12, 14 are formed to project from the back of the lid 8. The walls 12, 14 are arranged to extend along the side walls, facing toward the front of the motor vehicle and toward the rear of the motor vehicle, of the retainer 2. Each wall 12, 14 is provided with apertures 16 in which the hooks 10 of the corresponding side wall of the retainer 2 are inserted. Each aperture has a configuration like a slot which is long in the vertical direction. The hooks 10 are allowed to relatively move in the vertical direction within the apertures 16. The number of the apertures 16 of each wall 12, 14 is the same as the number of the hooks 10 formed on the corresponding side wall of the retainer 2. The apertures 16 are aligned in the width direction of the walls 12, 14 at the same intervals as the hooks and parallel to the hooks.

The lid 8 is allowed to be displaced relative to the retainer 2 in the vertical direction because the hooks 10 are movable in the vertical direction within the apertures 16.

In this embodiment, there is an opening for the installation of the airbag device between the rear edge of the hood (front hood) 18 of the motor vehicle and cowl top 22 beneath the windshield 20. The airbag device 1 is disposed in a space below the opening, wherein the retainer 2 is fixed to a vehicle member (not shown) through a bracket 24.

In the normal state, the lid 8 is located at its lowest position in the space below the opening. The lowest position of the lid 8 is lower than the rear edge of the hood 18 and the cowl top 22, i.e. more inner position of the vehicle body than these parts. When the airbag 4 is inflated, the lid 8 is pushed up by the airbag 4 being inflated so as to move upward. The lid 8 can move upward until the hooks 10 comes in contact with the lower edge of the opening 16.

Windshield wipers 26 are attached to the cowl top 22. The front end of the motor vehicle such as a front bumper (not shown) of a lower portion of the hood 18 is provided with a contact/impact detection sensor (not shown) for detecting a contact or collision between the motor vehicle during running and a pedestrian, a bicycle, or a motorcycle.

In the exterior airbag device 1 having the aforementioned structure, as the contact/impact detection sensor detects the collision, the gas generator 6 is triggered and the airbag 4 is inflated with gas from the gas generator 6.

As the inflation of the airbag 4 is started, the lid 8 is pushed up by the inflation pressure of the airbag 4 to a level nearly equal to or higher than the level of the rear edge of the hood 18 or the cowl top 22.

The lifted lid 8 is then torn along the tear line 9 by the pressing force from the airbag 4 so that the lid 8 is divided about the tear line 9 into two halves. One half on the vehicle front side and the other half on the vehicle rear side pivot outwardly like flaps (numerals 28, 30. see FIG. 3) toward the front and the rear of the motor vehicle, respectively. The flap 28 pivoted outwardly toward the front of the motor vehicle is laid on a rear edge portion of the hood 18. The flap 30 pivoted outwardly toward the rear of the motor vehicle is laid on the cowl top 22 so as to cover the windshield wipers 26. As a result, the airbag 4 can be smoothly deployed with being caught by neither the rear edge of the hood 18 nor the windshield wipers 26.

In the exterior airbag device 1, the lid 8 is located at a level lower than the rear edge of the hood 18 and the cowl top 22 in the normal state. Therefore, the airbag device is not conspicuous so that the motor vehicle has good appearance for an area including the rear edge of the hood 18 and portions about the cowl top 22. In addition, the lid 8 is hardly exposed to direct sunlight and strong winds and rains, thereby improving the durability of the lid 8.

Moreover, as mentioned above, the lid 8 rises to the level nearly equal to or higher than the rear edge of the hood 18 and the cowl top 22 by the inflation pressure of the airbag 4 being inflated and, after that, is torn to open, whereby the opening movement of the lid 8 is extremely smooth.

Figure 4:
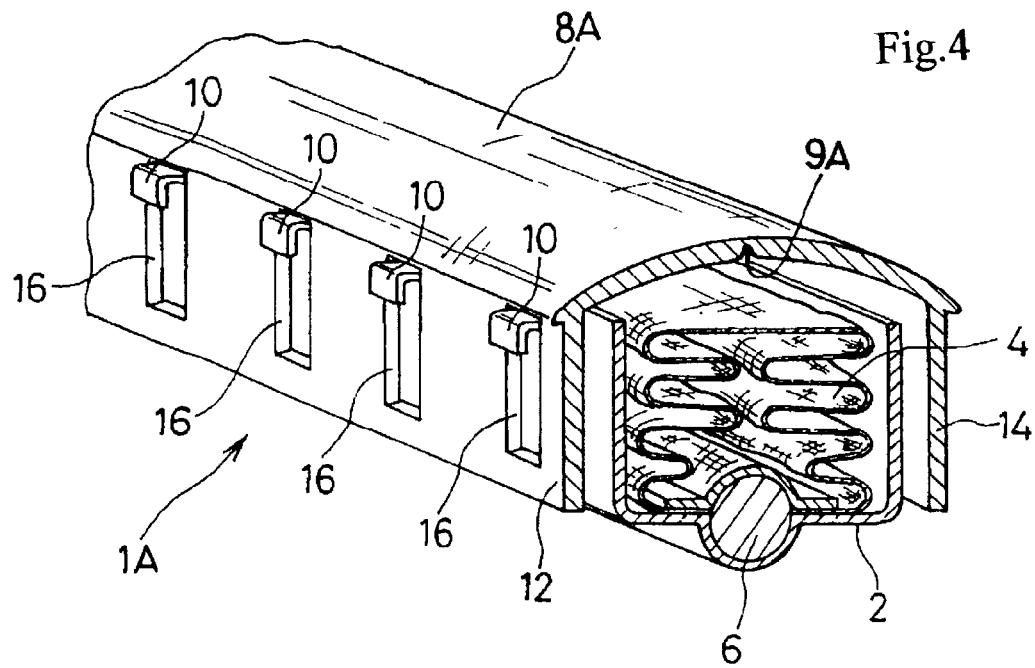
FIG. 4 is a perspective view of main parts of an exterior airbag device according to another embodiment of the present invention.
Figure 5:
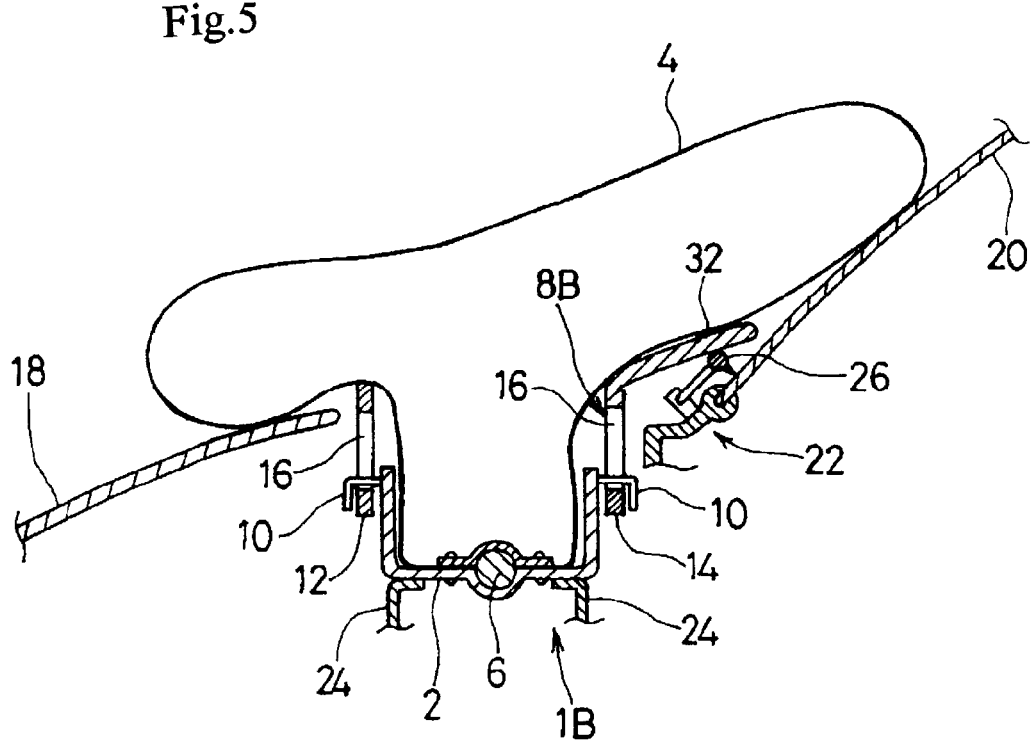
FIG. 5 is a vertical sectional view of a front body of a motor vehicle equipped with an exterior airbag device according to further another embodiment in a state where an airbag thereof is deployed.

Though the lid 8 has an inverted V-like sectional profile in which a portion about the middle in the longitudinal direction of the vehicle body is the highest portion and the sides are downslopes toward the front and rear of the vehicle body, respectively, in the above embodiment, the lid of the exterior airbag device of the present invention may have a flat top or another configuration such as configurations shown in FIG. 4 and FIG. 5.

FIG. 4 is a perspective view of main parts of an exterior airbag device according to another embodiment of the present invention.

In the exterior airbag device 1A shown in FIG. 4, a lid 8A has an arc-like sectional profile in which a portion about the middle in the vehicle longitudinal direction (the right and left direction in FIG. 4) is the highest portion. The lid 8A is provided with a tear line 9A which is formed in the back of the lid 8 about the middle in the longitudinal direction of the vehicle body to extend in the width direction of the vehicle body.

The other structure of the lid 8A is the same as that of the lid 8 shown in FIGS. 1 through 3. When the airbag 4 is inflated, the lid 8A is pushed up by the inflation pressure from the airbag 4 and, after that, is torn along the tear line 9A so that the lid 8A is divided into two halves like flaps on the vehicle front side and on the vehicle rear side. These halves pivot toward the front of the motor vehicle and the rear of the motor vehicle, respectively.

Besides the lid 8A, the structure of the exterior airbag device 1A is the same as that of the aforesaid exterior airbag device 1 shown in FIG. 1 through FIG. 3. In FIG. 4, the same parts as shown in FIG. 1 through FIG. 3 are marked with the same numerals, thus omitting the description about the parts.

FIG. 5 is a vertical sectional view of a front body of a motor vehicle in a state where an airbag of the exterior airbag device according to further another embodiment is deployed.

In either of the aforementioned embodiments, two flaps i.e. halves of the lid pivot toward the front of the motor vehicle and the rear of the motor vehicle, respectively, according to the inflation of the airbag. In the exterior airbag device 1B shown in FIG. 5, only one flap pivots toward the front or rear of the motor vehicle according to the inflation of the airbag.

In the exterior airbag device 1B shown in FIG. 5, a tear line (not shown) is formed along a proximal end portion of the wall 12 on the vehicle front side of the lid 8B. When the air bag 4 is inflated, the lid 8B is pushed up by the inflation pressure of the airbag 4 to a level nearly equal to or higher than the level of the rear edge of the hood 18 or the cowl top 22 and, after that, is torn along the tear line so that a portion on the vehicle rear side relative to the tear line pivots like a flap (numeral 32) toward the rear of the motor vehicle and is laid on the cowl top 22.

Then, the airbag 4 is deployed to expand over an area including the rear portion of the hood 18 and the outer surface of the windshield 20. During this, the airbag 4 is smoothly deployed without being caught by the windshield wipers 26 because the windshield wipers 26 attached to the cowl top 22 is covered by the flap 32.

Besides the lid 8B, the structure of the exterior airbag device 1B is the same as that of the aforesaid exterior airbag device 1 shown in FIG. 1 through FIG. 3. In FIG. 5, the same parts as shown in FIG. 1 through FIG. 3 are marked with the same numerals, thus omitting the description about the parts.

Figure 6:
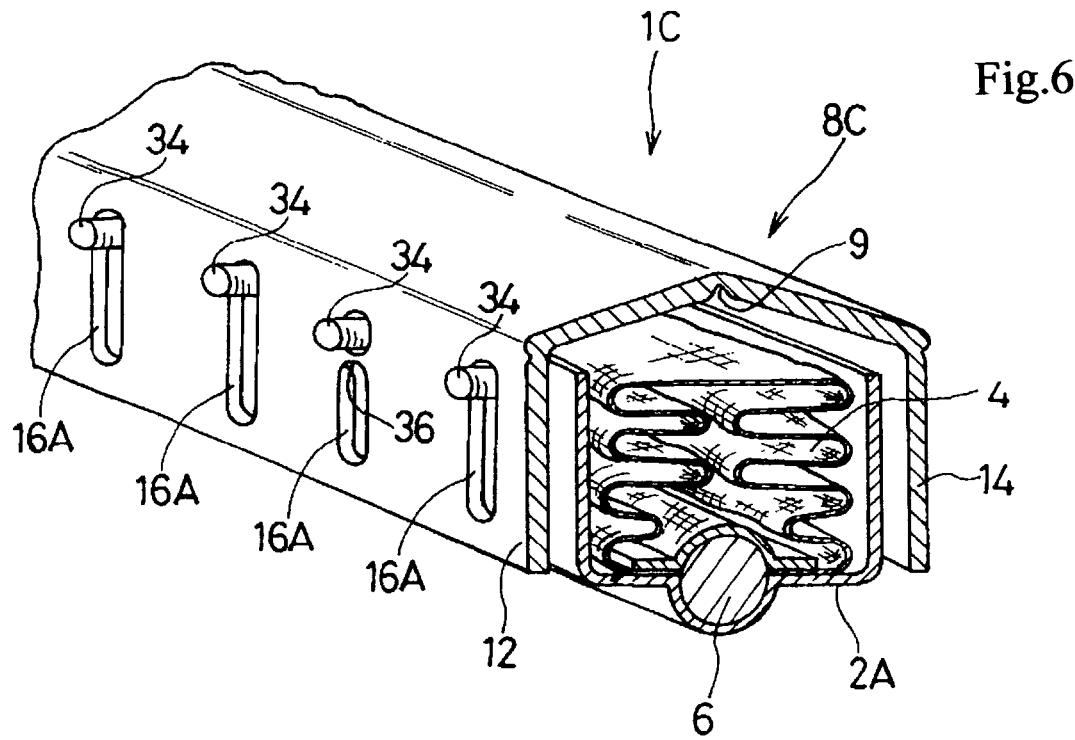
FIG. 6 is a perspective view of main parts of an exterior airbag device according to another embodiment of the present invention.
Figure 7:
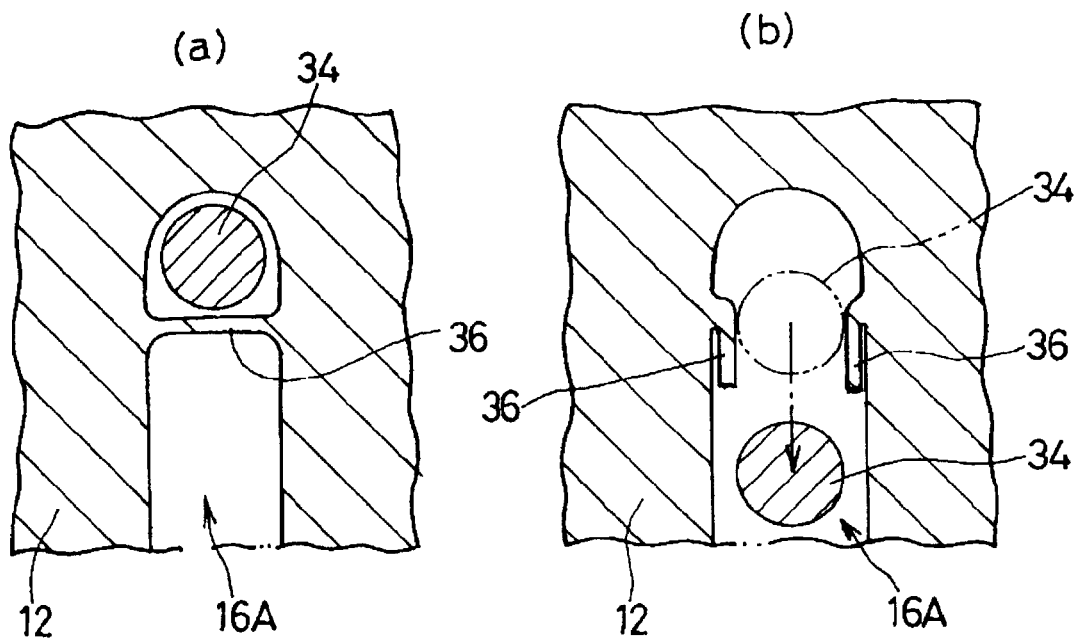
FIGS. 7(a), 7(b) are partial sectional views of a lid of the exterior airbag device of FIG. 6.

FIG. 6 is a perspective view of main parts of an exterior airbag device according to another embodiment of the present invention, and FIGS. 7(*a*), 7(*b*) are sectional views taken along the extending direction of walls of a lid of the exterior airbag device, wherein FIG. 7(*a*) shows a normal state thereof and FIG. 7(*b*) shows a state where an airbag of the exterior airbag device is deployed.

In the exterior airbag device 1C, a retainer 2A is provided with a plurality of pins 34 which are formed on upper portions of the both side walls, facing toward the front of the motor vehicle and toward the rear of the motor vehicle, of the retainer 2A for retaining a lid 8C. The arrangement of the pins 34 and the work of the pins 34 are similar to those of the hooks 10 of the aforementioned retainer 2.

The lid 8C has walls 12, 14 projecting from the back thereof to overlap the side wall facing toward the front of the motor vehicle and the side wall facing toward the rear of the motor vehicle of the retainer 2A. The pins 34 of the side walls are inserted into slit-like apertures 16A formed in the corresponding walls 12, 14. In this manner, the lid 8C is retained above the retainer 2A. The apertures 16A exhibit the same work as the apertures 16 of the aforementioned retainer 2. By allowing the movement of the pins 34 in the vertical direction within the apertures 16A, the lid 8C is allowed to be displaced relative to the retainer 2A in the vertical direction.

In this embodiment, one of the apertures 16A is provided with a partition 36 for retaining the pin 34 inserted therein at an upper portion of the aperture 16A. By the partition 36, the pin 34 is retained at the upper portion of the aperture 16A in the normal state, thereby preventing the upward movement of the lid 8C.

As the lid 8C is subjected to the inflation pressure of the airbag 4 so as to intend to move upward, the partition 36 is broken by the pin 34 to allow the downward movement of the pin within the aperture 16A as shown in FIG. 7(*b*). Therefore, the upward movement of the lid 8C is also allowed.

The other structure of the exterior airbag device 1C is the same as that of the exterior airbag device 1 shown in FIGS. 1 through 3. In FIG. 6 and FIGS. 7(*a*), 7(*b*), the same parts as shown in FIG. 1 through FIG. 3 are marked with the same numerals, thus omitting the description about the parts.

In the exterior airbag device 1C having the aforementioned structure, the lid 8C is retained in its lowest position in the normal state and is prevented from moving upward. Therefore, the vertical movement of the lid 8C due to shaking of the motor vehicle during running can be prevented.

Figure 8:
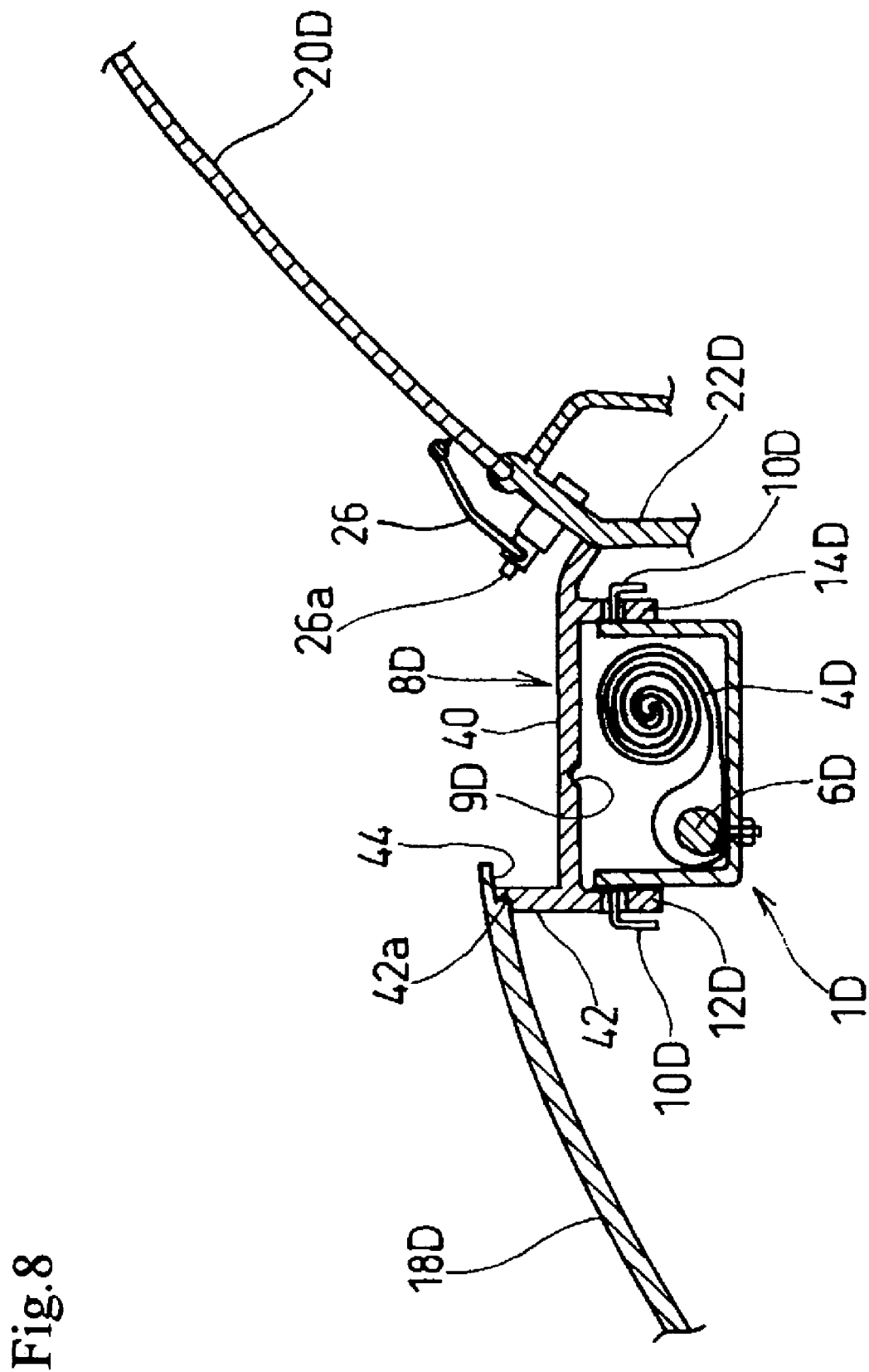
FIG. 8 is a vertical sectional view of a front body of a motor vehicle equipped with an exterior airbag device according to further another embodiment in the normal state.
Figure 9:
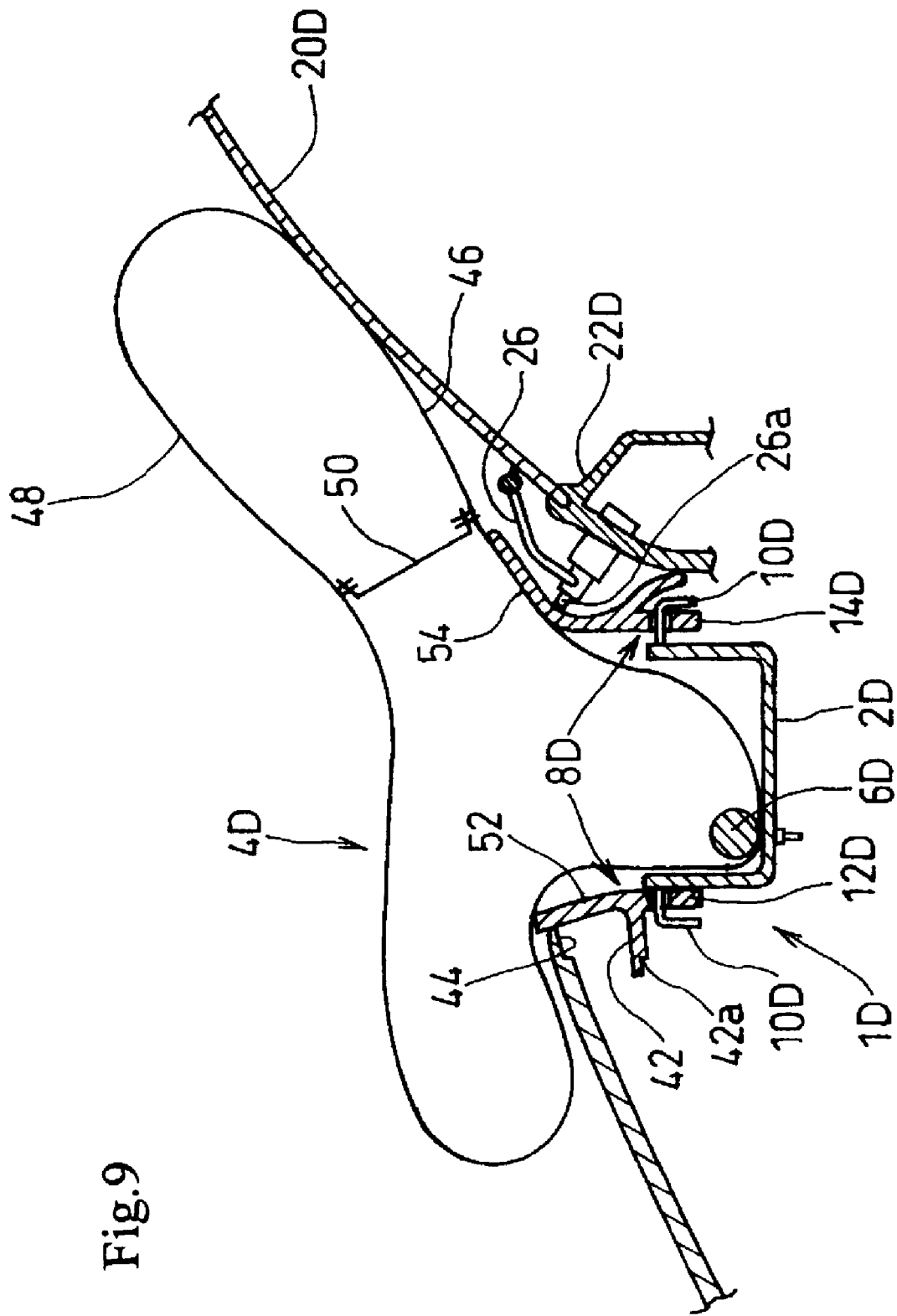
FIG. 9 is a vertical sectional view of the front body of the motor vehicle in a state where an airbag of the exterior airbag device of FIG. 8 is deployed.

Though the lid is disposed at the lower position in a space below the opening for the installation of the airbag device in the normal state in any of the aforementioned embodiments, the lid may be arranged to cover the opening for the installation of the airbag device. FIG. 8 and FIG. 9 are vertical sectional views of a front body of a motor vehicle equipped with such an exterior airbag device. FIG. 8 shows a normal state of the exterior airbag device and FIG. 9 shows a state where an airbag of the exterior airbag device is deployed. In the following description, the term "longitudinal direction" means the fore and aft direction of the motor vehicle and the term "lateral direction" means the width direction of the motor vehicle.

In this exterior airbag device 1D, a lid 8D covering an open top of a container-like retainer 2D closes an opening for the installation of the airbag device formed between a hood 18D and a cowl top 22D.

The lid 8D mainly comprises a main plate 40 covering the opening for the installation of the airbag device, a standing wall 42 upwardly standing on the front edge of the main plate 40, a suspended wall 12D downwardly extending from the front edge of the main plate 40 along a front side wall of a retainer 2D so that the suspended wall 12D and the standing wall 42 seem to be one piece, and a suspended wall 14D downwardly extending from the back of the main plate 40 along the rear side wall of the retainer 2D so that the suspended wall 14D is opposed to the suspended wall 12D.

The rear end of the main plate 40 is in contact with a front portion of the cowl top 22D and the upper end of the standing wall 42 is in contact with the lower surface (back) of a rear end portion of the hood 18D. The suspended walls 12D, 14D are retained by hooks 10D formed on the front side wall and the rear side wall of the retainer 2D, respectively. The main plate 40 is provided with a tear line 9D. The tear line 9D is composed of a groove formed in the back of the main plate 40 about the middle in the vehicle longitudinal direction of the main plate 40 to extend in the lateral direction.

The hood 18D is provided with a step 44. The step 44 is formed in a back of the rear end portion of the hood 18D for receiving the upper end of the standing wall 42. The lid 8D has a notch-like step 42*a* formed in the upper end of the standing wall 42. The step 42*a* is fitted to the step 44, whereby the lid 8D is fixed in its proper position in the space below the opening for the installation of the airbag device.

In this embodiment, a gas generator 6D is disposed along the front edge of the bottom of the retainer 2D as shown in FIG. 8. With this gas generator 6D, an airbag 4D is secured to the bottom of the retainer 2D. The retainer 2D is fixed to a vehicle member (not shown) through a bracket (not shown).

The airbag 4D is deployable to expand over an area including the outer surface of the rear portion of the hood 18D and the outer surface of the windshield 20D. In the normal state, the airbag 4D is rolled to reduce its volume and is accommodated in the retainer 2D. As shown in FIG. 9, the airbag 4D has a tether (band-like member) 50 which connects a vehicle-side area 46 facing to the hood 18D and the outer surface of the windshield 22 and a pedestrian-receiving-side area 48 in the deployed state of the airbag 4D, thereby preventing the pedestrian-receiving side area 48 from excessively rising toward the pedestrian.

The tether 50 is disposed to limit the rising of the pedestrian-receiving-side area 48 near the boundary between the hood 18D and the windshield 20D. Therefore, the airbag 4D can be smoothly deployed according to the profile of the hood 18D and the outer surface of the windshield 20D.

In the exterior airbag device 1D having the aforementioned structure, as the contact/impact detection sensor (not shown), disposed on a front end portion of the motor vehicle such as a front bumper (not shown), detects a collision so as to actuate the gas generator 6D, the airbag 4D is inflated with gas from the gas generator 6D. The main plate 40 of the lid 8D is thus torn along the tear line 9D by the inflation pressure of the airbag 4D so that the main plate 40 is divided about the tear line 9 into two halves. One half on the vehicle front side and the other half on the vehicle rear side pivot like flaps (numerals 52, 54. see FIG. 9) about the proximal ends of the suspended walls 12D, 14D toward the front and the rear of the motor vehicle, respectively.

Then, the flap 52 pivoted outwardly toward the front of the motor vehicle is laid on a rear edge portion of the hood 18D and the flap 54 pivoted outwardly toward the rear of the motor vehicle is laid on pivots 26a of the windshield wipers 26' disposed on the front portion of the cowl top 22D. The airbag 4D can be smoothly deployed with being caught by neither the rear end portion of the hood 18D nor the pivots 26a of the windshield wipers 26'.

In the exterior airbag device 1D of this embodiment, the upper end of the standing wall 42 is fitted to the step 44 formed in the back of the rear end portion of the hood 18D and the rear end of the main plate 40 is in contact with the front portion of the cowl top 22D, thereby securely preventing the lid 8D from rattling. Since the opening for the installation of the airbag device is closed by the lid 8D, the weatherability of the airbag device 1D and other instruments inside the motor vehicle is extremely improved.

In the lid 8D of the exterior airbag device 1D of this embodiment, the tear line 9D is formed about the middle in the longitudinal direction of the main plate 40 so as to create two flaps 52, 54 which pivot outwardly toward the front and the rear of the motor vehicle, respectively, during inflation of the airbag 4D. However, the tear line may be form in another location. Just like a lid 8E of an exterior airbag device 1E shown in FIG. 10 as will be described, a tear line 9E may be formed along the rear edge of a main plate 40E so as to create only one flap 52E which pivots outwardly toward the front of the motor vehicle during inflation of the airbag. Alternatively, just like a lid 8F of an exterior airbag device 1F shown in FIG. 11, a tear line 9F may be formed along the front edge of a main plate 40F so as to only one flap 54F which pivots outwardly toward the rear of the motor vehicle during inflation of the airbag.

Figure 10:
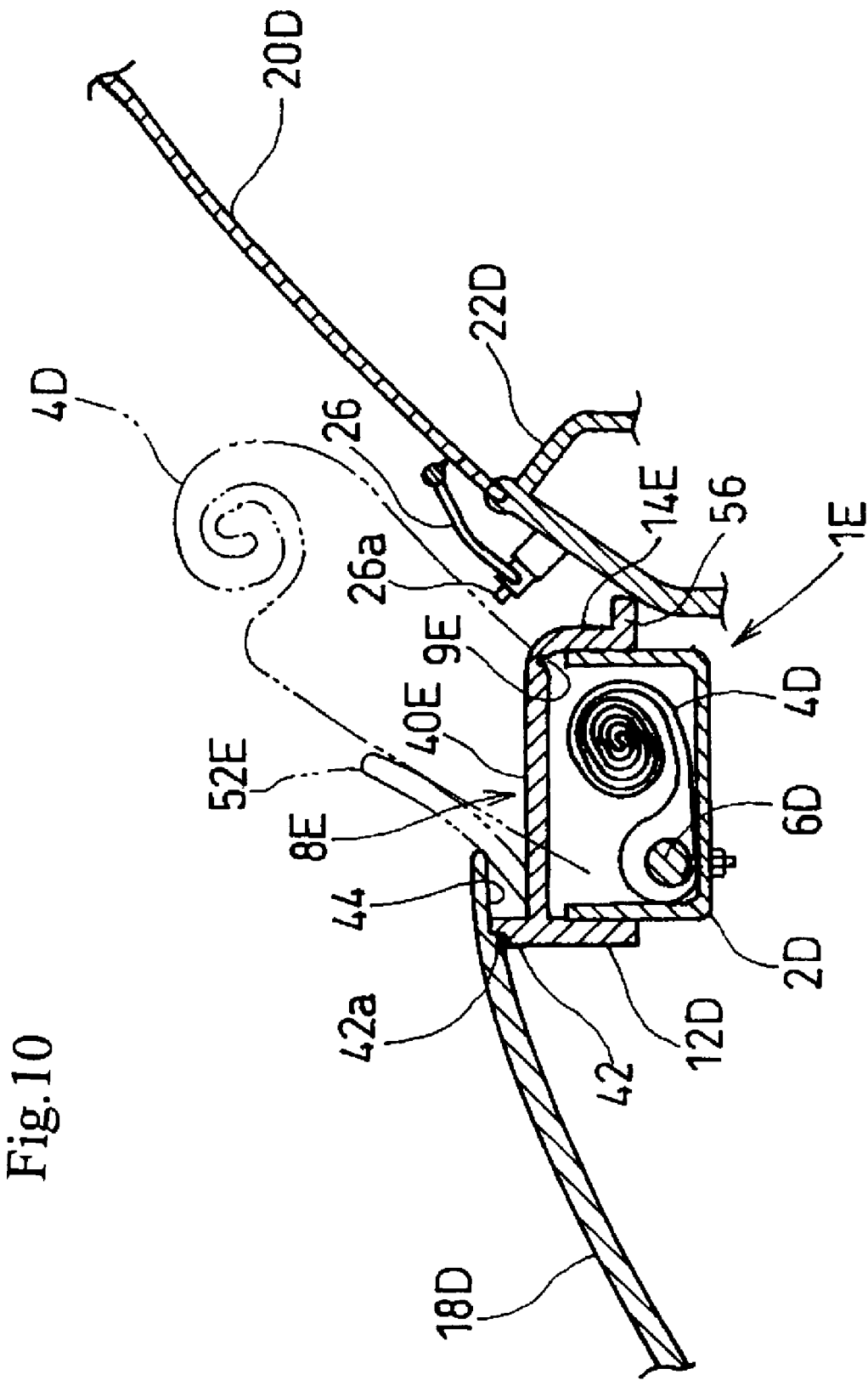
FIG. 10 is a vertical sectional view of a front body of a motor vehicle equipped with an exterior airbag device according to still another embodiment.

In the exterior airbag device 1E shown in FIG. 10, a suspended wall 14E extends from the rear edge of the main plate 40E of the lid 8E along the rear side wall of the retainer 2D. The suspended wall 14E has a flange 56 projecting from the lower edge thereof to be in contact with the front portion of the cowl top 22D. The tear line 9E is formed near the proximal end of the suspended wall 14E to extend along the rear edge of the main plate 40E. The other structure of the exterior airbag device 1E is basically the same as that of the exterior airbag device 1D shown in FIGS. 8 and 9. In FIG. 10, the same parts as shown in FIGS. 8, 9 are marked with the same numerals, thus omitting the description about the parts.

In the exterior airbag device 1E, as the airbag 4D is inflated, the main plate 40E is torn along the tear line 9E by the inflation pressure of the airbag 4D so as to create a flap 52E as shown by two-dot chain line in FIG. 10. The flap 52E outwardly pivots about a portion near the proximal end of the suspended wall 12D toward the front of the motor vehicle so as to cover the rear end portion of the hood 18D. The airbag 4D can be guided by the flap 52E so that the airbag 4D can be smoothly deployed.

Figure 11:
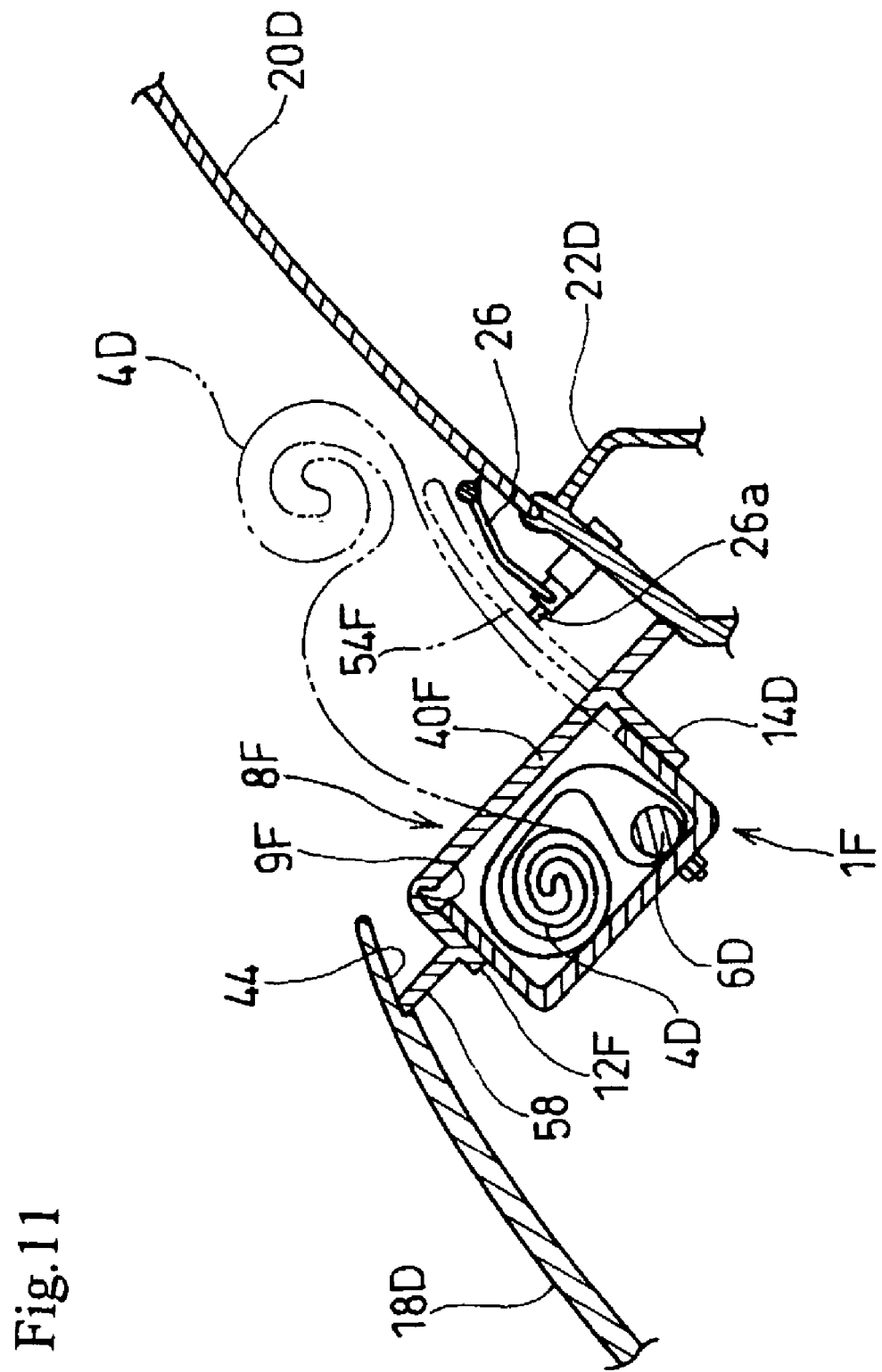
FIG. 11 is a vertical sectional view of a front body of a motor vehicle equipped with an exterior airbag device according to a difference embodiment in the normal state.

In the exterior airbag device 1F shown in FIG. 11, a suspended wall 12F extends from the front edge of the main plate 40F of the lid 8F along the front side wall of the retainer 2D. The suspended wall 12F has a flange 58 projecting from a lower edge portion thereof to be in contact with a step 44 formed in the hood 18D. The tear line 9F is formed near the proximal end of the suspended wall 12F to extend along the front edge of the main plate 40F. The rear end of the main plate 40F is in contact with the front portion of the cowl top 22D. In the exterior airbag device 1F, a gas generator 6D is arranged along a rear edge portion of the bottom of the retainer 2D. The other structure of the exterior airbag device 1F is basically the same as that of the aforesaid exterior airbag device 1D shown in FIGS. 8 and 9. In FIG. 11, the same parts as shown in FIGS. 8, 9 are marked with the same numerals, thus omitting the description about the parts.

In the exterior airbag device 1F, as the airbag 4D is inflated, the main plate 40F is torn along the tear line 9F by the inflation pressure of the airbag 4D so as to create a flap 54F as shown by two-dot chain line in FIG. 11. The flap 54F outwardly pivots about a portion near the proximal end of the suspended wall 14D toward the rear of the motor vehicle so as to laid on the pivots 26a of the windshield wipers 26'. The airbag 4D can be guided by the flap 54F so that the airbag 4D can be smoothly deployed.

Figure 12:
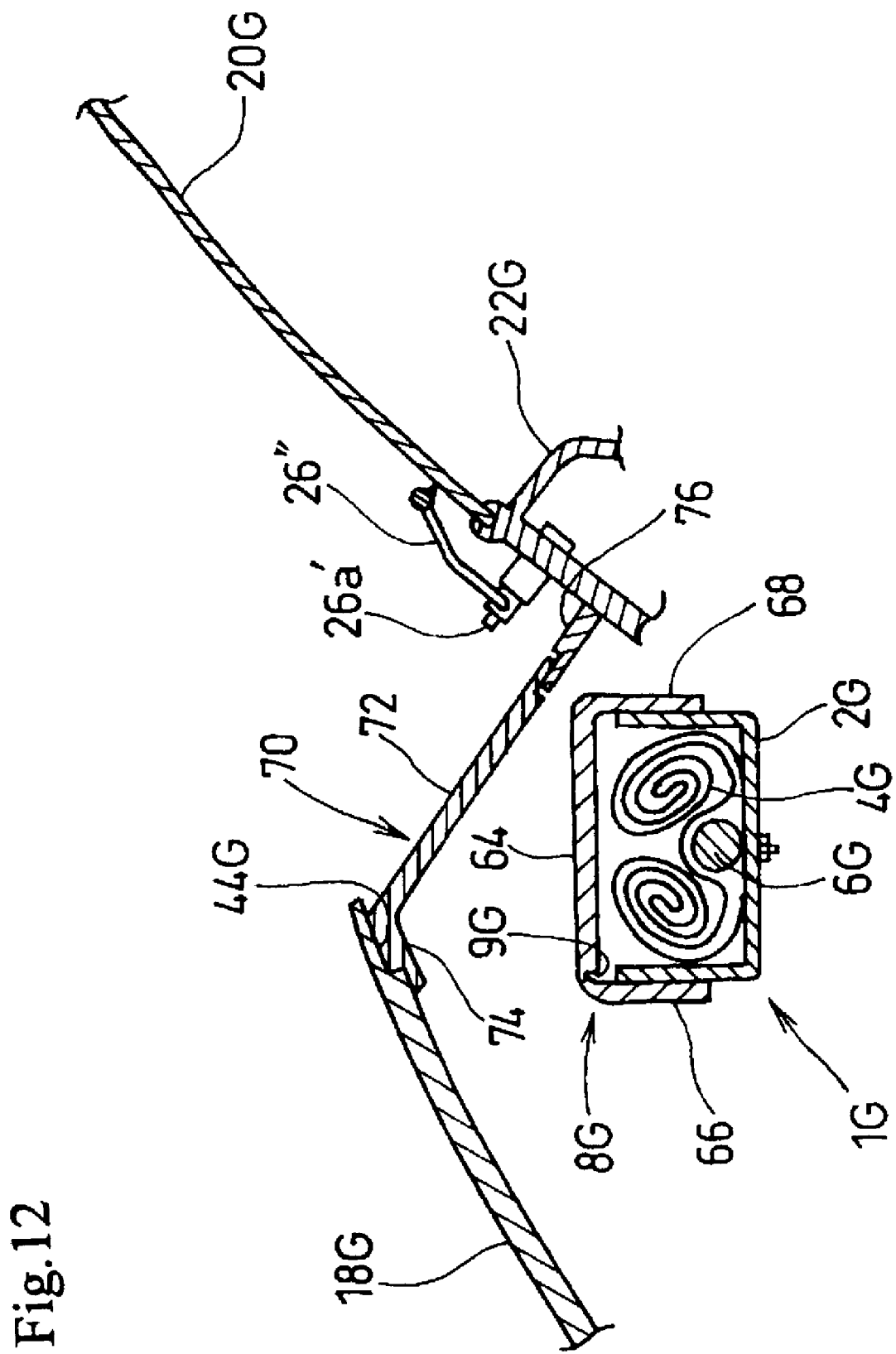
FIG. 12 is a vertical sectional view of a front body of a motor vehicle equipped with an exterior airbag device according to another difference embodiment in the normal state.
Figure 13:
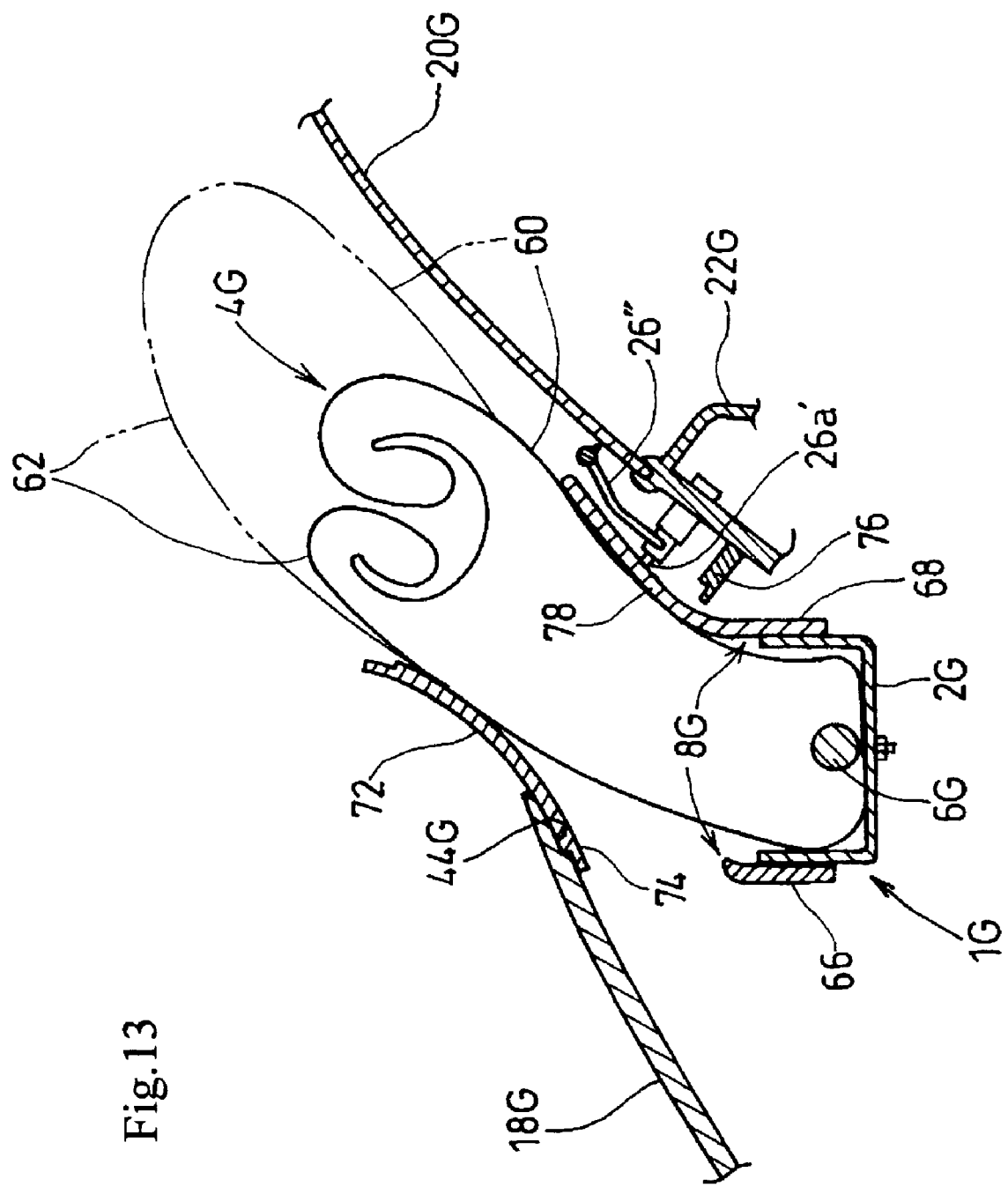
FIG. 13 is a vertical sectional view of the front body of the motor vehicle in a state where an airbag of the exterior airbag device of FIG. 12 is deployed.

According to the present invention, just like an exterior airbag device 1G shown in FIGS. 12 and 13 as will be described, a lid for closing the opening for installation of the airbag device may be provided separately from the lid to be attached to the retainer. Hereinafter, the exterior airbag device 1G will be described with reference to FIGS. 12 and 13. FIG. 12 and FIG. 13 are sectional views of a front body of a motor vehicle equipped with the exterior airbag device according to a different embodiment, wherein FIG. 12 shows a normal state of the exterior airbag device and FIG. 13 shows a state where an airbag of the exterior airbag device is deployed.

In the exterior airbag device 1G, a gas generator 6G is disposed on the bottom of a container-like retainer 2G about the middle in the vehicle longitudinal direction. The retainer 2G has an open top. With the gas generator 6G, the airbag 4G is secured to the bottom of the retainer 2G. The airbag 4G is deployable along the outer surface of the windshield 20G as shown in FIG. 13. In the normal state, the airbag 4G is accommodated in the retainer 2G in a state that a windshield-side area 60 and a pedestrian-receiving area 62 of the airbag 4G are compacted in rolls, respectively. The retainer 2G is installed through the opening for installation of the airbag device between the hood 18G and the cowl top 22G in the state that the lid 8G is attached to the retainer 2G to cover the open top of the retainer 2G. The retainer 2G is fixed to a vehicle member (not shown) through a bracket (not shown).

The lid 8G mainly comprises a main plate 64 covering the open top of the retainer 2G, and a pair of suspended walls 66, 68 which extend from the front edge and the rear edge of the main plate 64 along the front side wall and the rear side wall of the retainer 2G, respectively. A tear line 9G is formed in the main plate 64 near the proximal end of the suspended wall 66 to extend along the front edge of the main plate 64. The suspended walls 66, 68 are retained the front side wall and the rear side wall of the retainer 2G.

The opening for installation of the airbag device is closed by a lid 70. The lid 70 comprises a main plate 72 covering the opening for installation of the airbag device, a leg portion 74 which extends from the front edge of the main plate 72 along the back of the rear end portion of the hood 18G and is fitted in and fixed to a step 44G formed in the bottom of the rear end portion of the hood 18G, and a supporting portion 76 which is attached to a front portion of the cowl top 22G for supporting a rear end portion of the main plate 72.

In the exterior airbag device 1G having the aforementioned structure, as a impact detection sensor (not shown), disposed on a front end portion of the motor vehicle such as a front bumper (not shown), detects a collision so as to actuate the gas generator 6G, the airbag 4G is inflated with gas from the gas generator 6G. The main plate 64 is first torn along the tear line 9G by the inflation pressure of the airbag 4D to create a flap 78 (FIG. 13). The flap 78 pivots outwardly toward the rear of the motor vehicle about a portion near the proximal end of the suspended wall 68. Then, the main plate 72 of the lid 70 is pressed by the airbag 4G being inflated through the flap 78 so that the main plate 72 pivots outwardly toward the front of the motor vehicle about a portion near the proximal end of the suspended wall 74.

After that, as shown in FIG. 13, the flap 78 which pivoted toward the rear of the motor vehicle is laid on pivots 26a' of windshield wipers 26" disposed on the front portion of the cowl top 22G. The main plate 72 of the lid 70 which pivoted toward the front of the motor vehicle is laid on the rear end portion of the hood 18G. Therefore, the airbag 4G can be smoothly deployed with being caught by neither the rear edge of the hood 18G nor the pivots 26a' of the windshield wipers 26".

In this embodiment, as the airbag 4G is inflated, the flap 78 as a part of the main plate 64 of the lid 8G pivots outwardly toward the rear of the motor vehicle to cover the pivots 26a' of the windshield wipers 26" while the main plate 72 of the lid 70 pivots outwardly toward the front of the motor vehicle to cover the rear end portion of the hood 18G. To the contrary, the flap 78 as a part of the main plate 64 of the lid 8G may pivot outwardly toward the front of the motor vehicle to cover the rear end portion of the hood 18G while the main plate 72 of the lid 70 may pivot outwardly toward the rear of the motor vehicle to cover the pivots 26a' of the windshield wipers 26".

The exterior airbag device of the present invention may be installed to another place besides the aforementioned place of the vehicle body.

Figure 14:
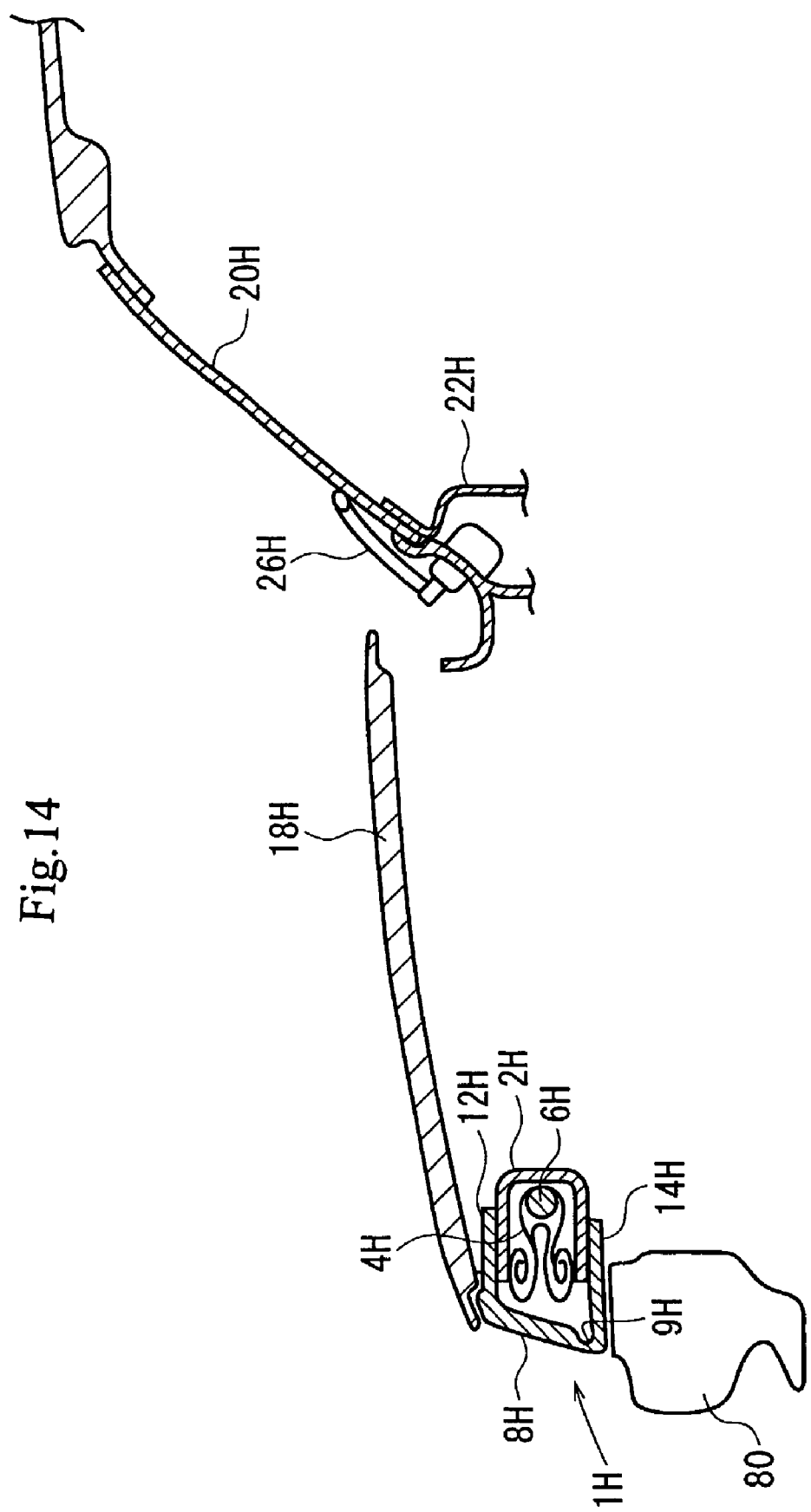
FIG. 14 is a vertical sectional view of a front body of a motor vehicle equipped with an exterior airbag device according to the second aspect of the present invention in the normal state.
Figure 15:
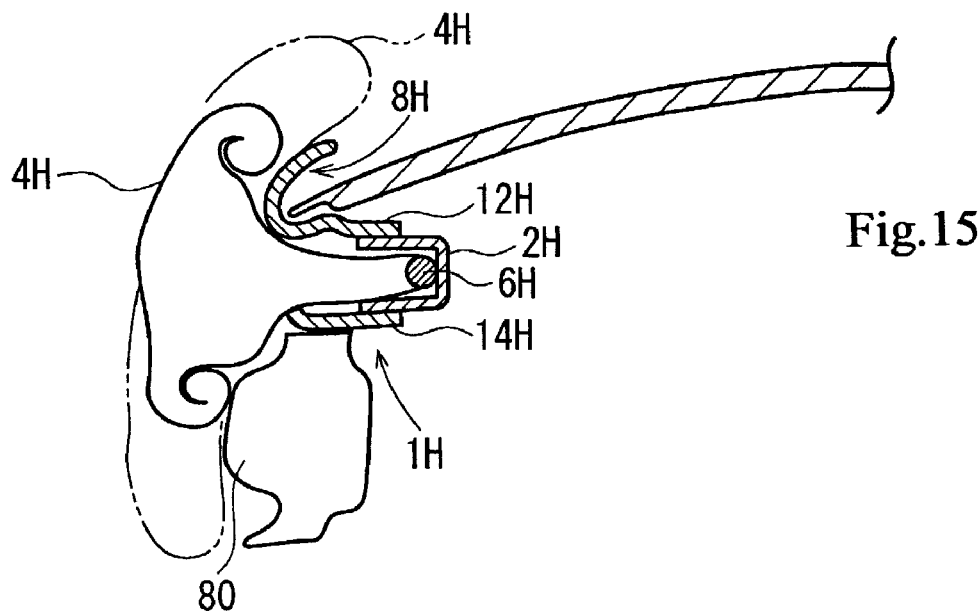
FIG. 15 is a sectional view showing a state where an airbag of the exterior airbag device of FIG. 14 is deployed.
Figure 16:
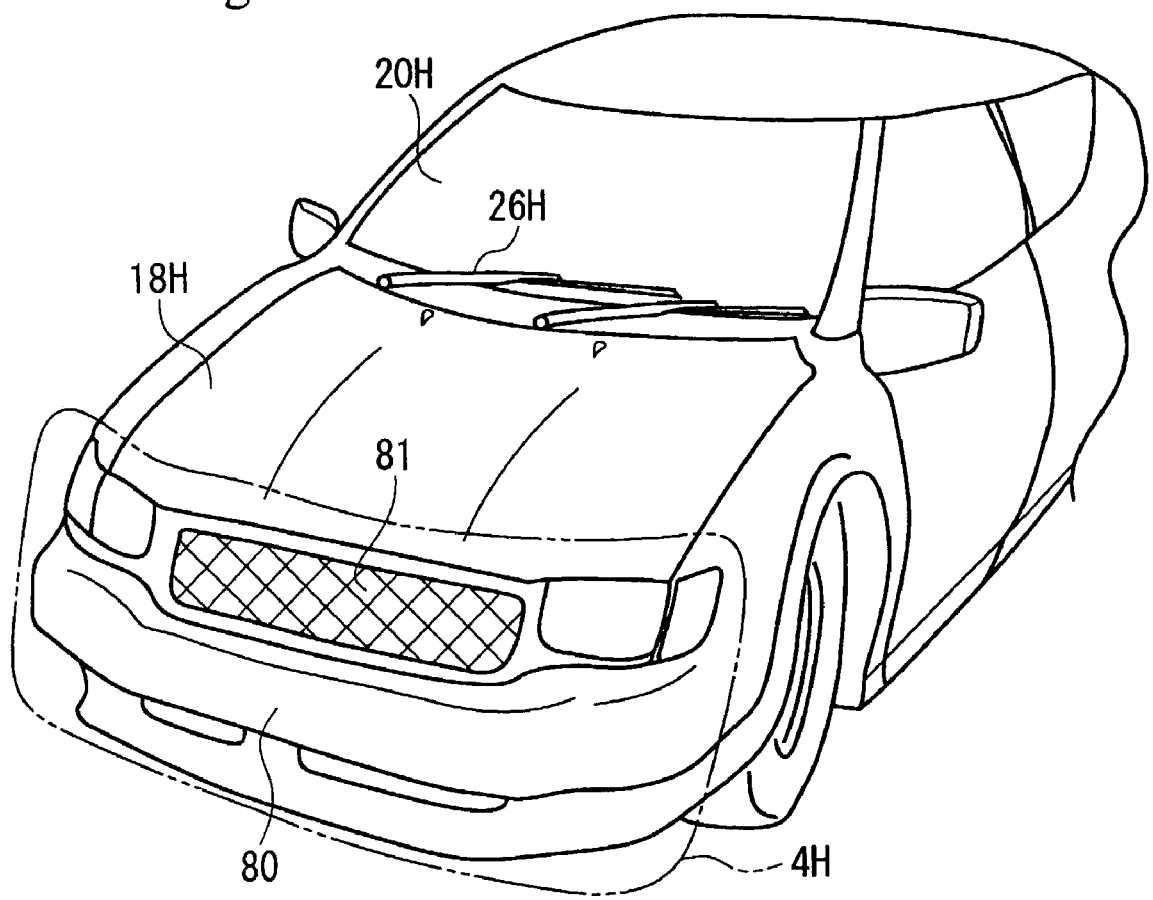
FIG. 16 is a perspective view of the motor vehicle equipped with the exterior airbag device of FIG. 14 as seen from diagonally front thereof.

For example, an exterior airbag device 1H shown in FIG. 14 through FIG. 16 is installed to a place inside a front grille 81 (FIG. 16) arranged above a front bumper 80. A front edge portion of the hood 18H overhangs the front grille 81.

The airbag device 1H has an airbag 4H which is deployable from the front grille 81 in all directions to expand over the front end face of the motor vehicle, including the front bumper 80 and the front portion of the hood 18H, as shown by two-dot chain line in FIG. 16. Normally, the airbag 4H is folded in such a manner that its upper half and its lower half in the deployed state are rolled and is accommodated in a retainer 2H which has an open front side. A lid 8H is attached to the open front side of the retainer 2H to cover the folded airbag 4H. In the normal state, the lid 8H composes a part of the front grille 81 or the entire front grille 81. A tear line 9H is formed in the lid 8H along the lower edge thereof.

In FIG. 14 through FIG. 16, a numeral 6H designates a gas generator for inflating the airbag 4H and numerals 12H, 14H designate leg portions for retaining the lid 8H to the retainer 2H. In addition, numerals 20H, 22H, and 26H designate a windshield, a cowl top disposed below the windshield, and windshield wipers of the motor vehicle, respectively.

In the exterior airbag device 1H of this embodiment, as the airbag 4H is inflated, the lid 8H is torn along the tear line 9H and thus pivots upwardly like a flap about a portion around the proximal end of the leg portion 12H to cover the front edge of the hood 18H as shown in FIG. 15. Therefore, the airbag 4H can be smoothly deployed over the front end face of the motor vehicle without being caught by a corner of the front edge of the hood 18H.

Figure 17:
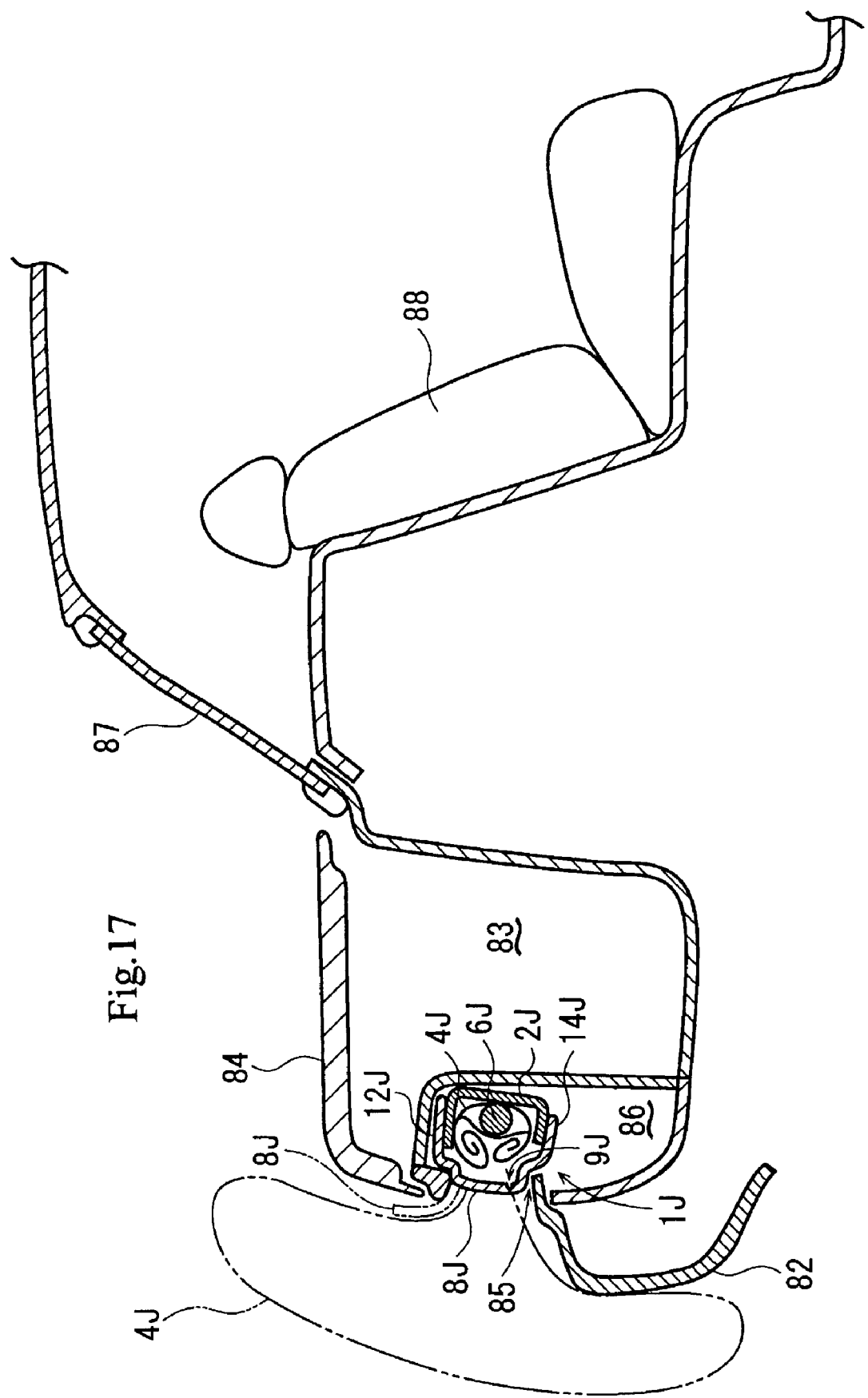
FIG. 17 is a vertical sectional view of a rear body of a motor vehicle equipped with an exterior airbag device according to further another embodiment of the second aspect of the present invention.
Figure 18:
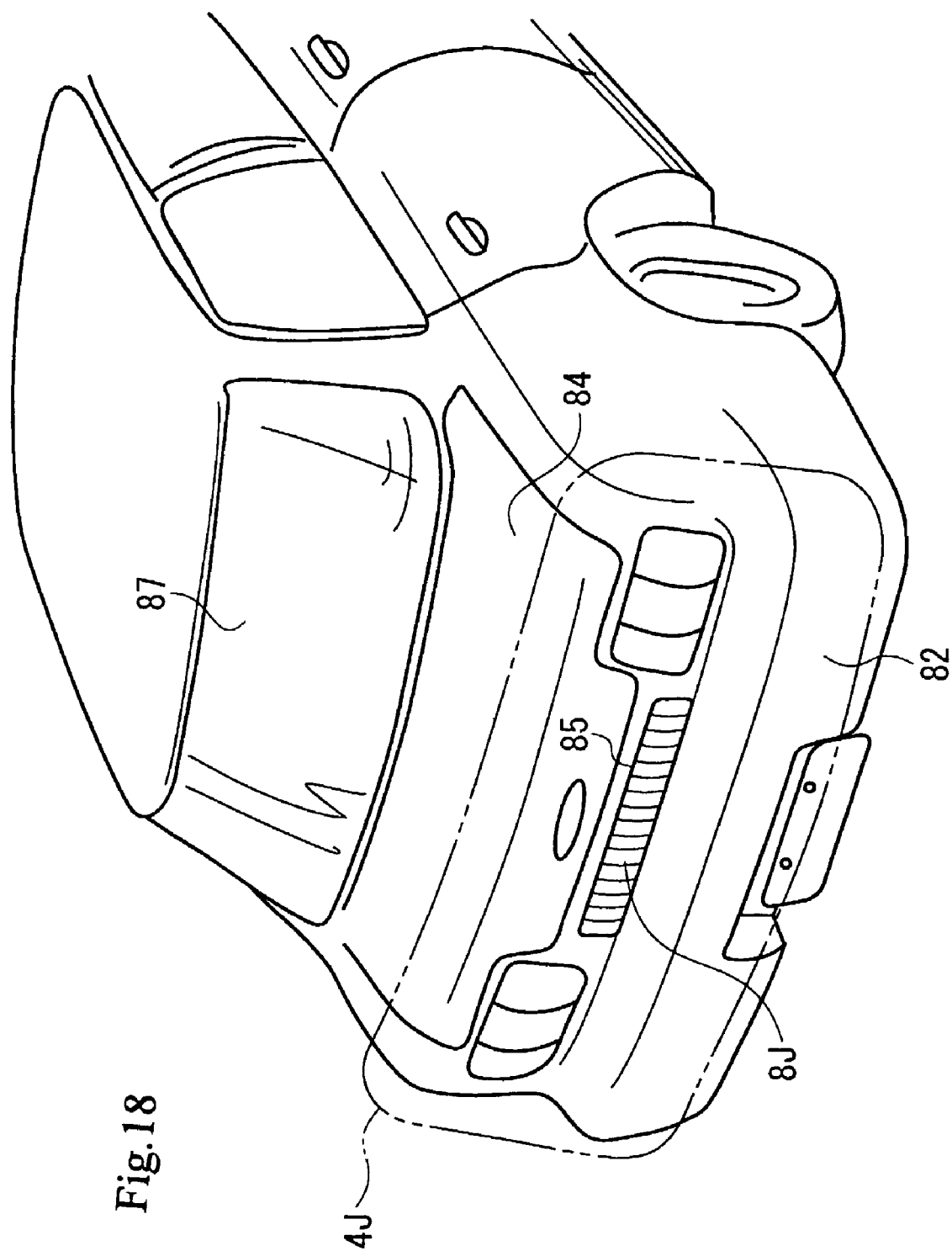
FIG. 18 is a perspective view of the motor vehicle equipped with the exterior airbag device of FIG. 17 as seen from diagonally behind thereof.

In the embodiment shown in FIG. 17 and FIG. 18, an opening 85 for allowing the airbag inflation is formed between an upper portion of a rear bumper 82 and a rear end portion of a hood (boot lid) 84 of a trunk room 83 and an airbag installation chamber 86 extending from the opening 85 is defined in the trunk room 83 at a rear side thereof. An exterior airbag device 1J is installed in this chamber 86.

The airbag device 1J has an airbag 4J which is deployable through the opening 85 over the rear end face of the motor vehicle including the rear bumper 82 and the rear portion of the hood 84. Normally, the airbag 4J is folded in such a manner that its upper half and its lower half in the deployed state are rolled and is accommodated in a retainer 2J which has an open rear side. A lid 8J is attached to the open rear side of the retainer 2J to cover the folded airbag 4J.

In the normal state, the lid 8J closes the opening 85 and composes a part of the rear end face. A tear line 9J is formed in the lid 8J along the lower edge thereof.

In FIG. 17 and FIG. 18, a numeral 6J designates a gas generator for inflating the airbag 4J and numerals 12J, 14J designate leg portions for retaining the lid 8J to the retainer 2J. In addition, numerals 87 and 88 designate a rear window glass and a rear seat of the motor vehicle, respectively.

In the exterior airbag device 1J of this embodiment, as the airbag 4J is inflated, the lid 8J is torn along the tear line 9J and thus pivots upwardly like a flap about the proximal end of the leg portion 12J to cover the upper edge of the opening 85 and the rear edge of the hood 84 as shown by two-dot chain line in FIG. 17. Therefore, the airbag 4J can be smoothly deployed over the rear end face of the motor vehicle with being caught by neither the upper edge of the opening 85 nor a corner of the rear edge of the hood 84.

In an embodiment shown in FIG. 19 and FIG. 20, opening 92A, 92B for allowing the airbag inflation are formed in side protection moldings 91A, 91B disposed on outer surfaces of a front door 90A and a rear door 90B (hereinafter, sometimes simply called as "doors 90A, 90B"), respectively, and exterior airbag devices 1K, 1L are mounted in inside spaces formed in the doors 90A, 90B extending from the openings 92A, 92B, respectively.

Figure 19:
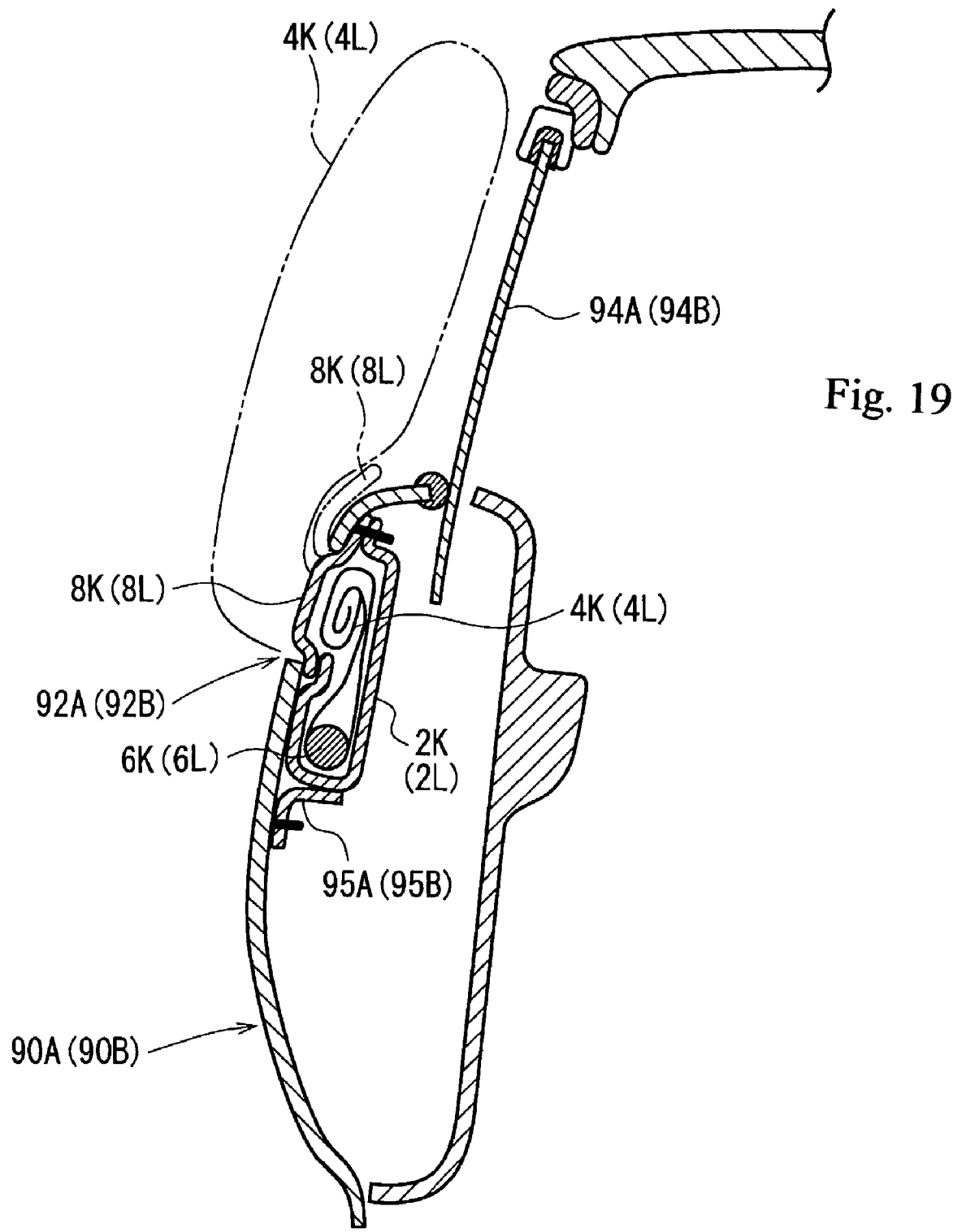
FIG. 19 is a vertical sectional view of a door of a motor vehicle equipped with an exterior airbag device according to still another embodiment of the second aspect of the present invention.
Figure 20:
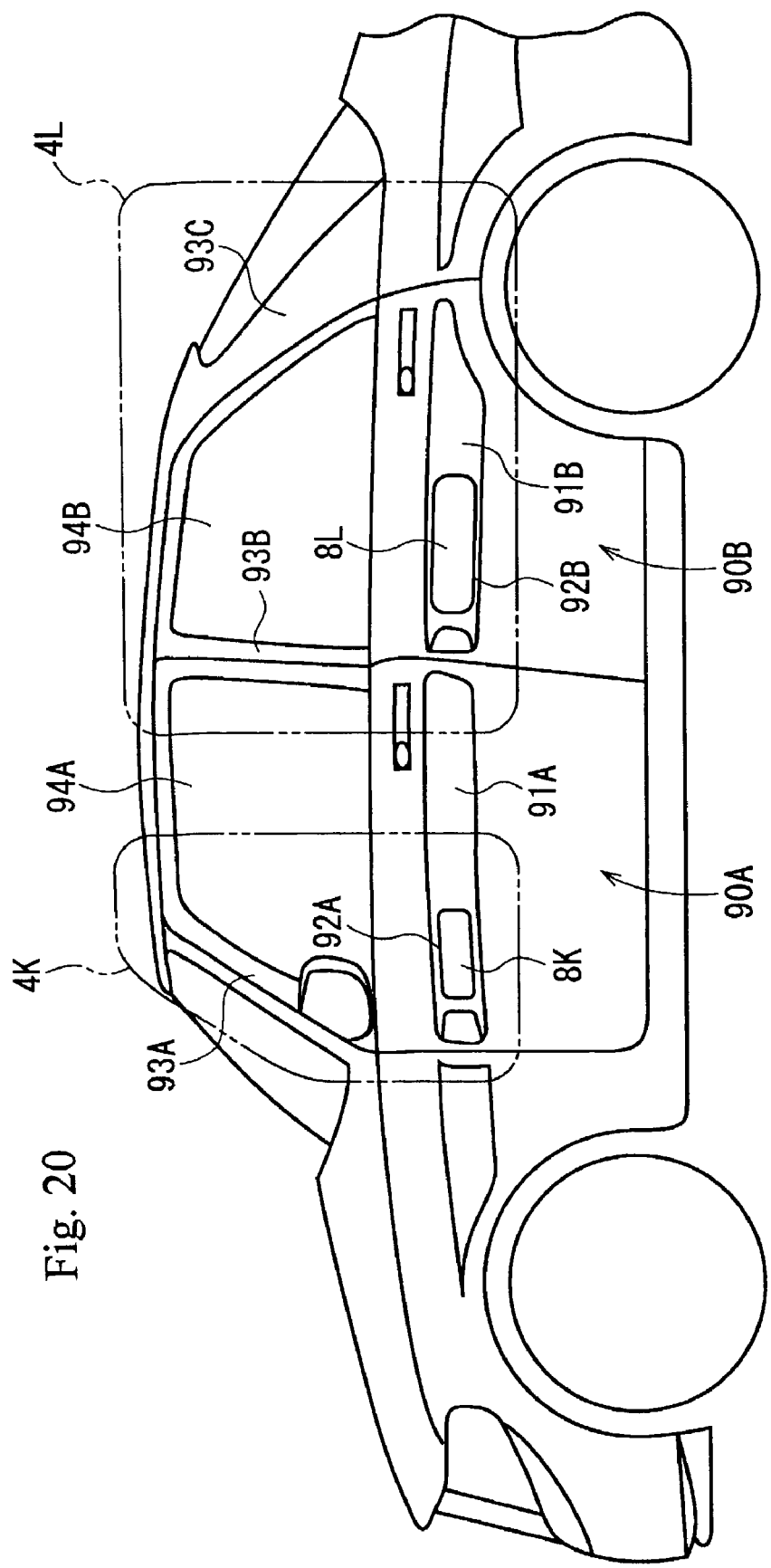
FIG. 20 is a side view of the motor vehicle equipped with the exterior airbag device of FIG. 19.

The airbag device 1K has an airbag 4K which is deployable through the opening 92A to expand over a side face of the vehicle body to cover an area including an upper portion of the door 90A, an A-pillar 93A, and a side window glass 94A as shown by two-dot chain line in FIG. 19 and FIG. 20. Normally, the airbag 4K is folded into a roll and is accommodated in a retainer 2K which is open toward the opening 92A. A lid 8K is attached to the retainer 2K to cover the folded airbag 4K. In the normal state, the lid 8K closes the opening 92A and composes a part of the side protection molding 91A. A tear line 9K is formed in the lid 8K along the lower edge thereof.

On the other hand, the airbag device 1L has an airbag 4L which is deployable through the opening 92B to expand over a side face of the vehicle body to cover an area including an upper portion of the door 90B, a B-pillar 93B, a C-pillar 93C, and a side window glass 94B as shown by two-dot chain line in FIG. 19 and FIG. 20. Normally, the airbag 4L is folded into a roll and is accommodated in a retainer 2L which is open toward the opening 92B. A lid 8L is attached to the retainer 2L to cover the folded airbag 4L. In the normal state, the lid 8L closes the opening 92B and composes a part of the side protection molding 91B. A tear line 9L is formed in the lid 8L along the lower edge thereof.

In FIG. 19, numerals 6K, 6L designate gas generators for inflating the airbags 4K, 4L, respectively, and numerals 95A, 95B designate brackets for fixing the retainers 2K, 2L to inner surfaces of the doors 90A, 90B, respectively.

In this embodiment, as the airbags 4K, 4L are inflated, the lids 8K, 8L are torn along the respective tear lines 9K, 9L and thus pivot upwardly like flaps to cover the front edges of the openings 92A, 92B as shown by two-dot chain line in FIG. 19. Therefore, the airbags 4K, 4L can be smoothly upwardly deployed through the respective openings 92A, 92B to expand over the side faces of the vehicle body without being caught by the upper edges of the openings 92A, 92B.

Though the openings 92A, 92B for allowing airbag inflation are formed in the side protection moldings 91a, 91B of the doors 90A, 90B for preventing the openings from marring the appearance of the vehicle body in the above embodiment, the locations of the openings 92A, 92B are not limited thereto.

The above embodiments are illustrative examples of the present invention. It should be understood that the present invention may have another form different from the examples shown in the attached drawings. For example, a plurality of external airbag devices of the present invention may be installed in other locations of the vehicle body. The exterior airbag device of the present invention may be structured to be deployed not only when the motor vehicle collides with a pedestrian but also when predicts the collision between the motor vehicle and a pedestrian.

As described above, the present invention can provide an exterior airbag device which can smoothly deploy its airbag with being caught by neither a rear edge of a hood nor windshield wipers.

What is claimed is:

1. An airbag device for being deployed along the exterior of a motor vehicle having a hood and a windshield including wipers associated therewith, the airbag device comprising:
   an airbag;
   a gas generator for inflating the airbag;
   a casing for the airbag mounted to the motor vehicle;
   a lid for the casing positioned to cover the airbag prior to deployment thereof;
   a separable portion associated with the lid at a predetermined location therealong; and
   a cover portion of the lid that is released at the predetermined location via the separable portion thereat during opening of the lid upon airbag deployment with the cover portion being sized to extend over adjacent portions of at least one of the hood and the windshield wipers with the airbag deployed and the cover portion released at the predetermined location for smooth airbag deployment along the exterior of the vehicle.

2. The airbag device of claim 1 wherein the lid cover portion comprises cover portions that cover adjacent portions of both the hood and the windshield wipers when the lid is opened.

3. The airbag device of claim 1 wherein a second lid extends generally between the hood and the windshield over the casing lid so that opening of the casing lid via airbag deployment causes opening of the second lid.

4. The airbag device of claim 3 wherein the cover portion of the casing lid covers adjacent portions of one of the hood and the windshield wipers and the second lid covers adjacent portion of the other of the hood and the windshield wipers with deployment of the airbag.

5. The airbag device of claim 1 in combination with the motor vehicle.

6. The airbag device of claim 1 wherein the separable portion comprises a frangible portion of the lid at the predetermined location therealong with airbag deployment breaking the lid at the frangible portion.

7. The airbag device of claim 1 wherein the lid has opposite sides spaced by a predetermined distance therebetween, and the predetermined location of the separable portion is approximately midway between the sides such that the cover portion comprises a pair of cover portions with the predetermined distance sized so that the cover portions extend to cover respectively the adjacent portions of the hood and the windshield wipers when the airbag is deployed.

8. The airbag device of claim 1 wherein the lid has opposite sides spaced by a predetermined distance therebetween, and the predetermined location of the separable portion is closer to one side than the other so that the cover portion is formed between the other side and the separable portion upon airbag deployment and only covers the adjacent portions of either the hood or the windshield wipers.

9. The airbag device of claim 1 wherein the casing and the lid include guide structure therebetween causing the lid to shift away from the casing prior to opening when the airbag is deployed.

10. An airbag device for being deployed along the exterior of a motor vehicle having a hood and a windshield including wipers associated therewith, the airbag device comprising:
    an airbag;
    a gas generator for inflating the airbag;
    a casing for the airbag mounted to the motor vehicle; and
    a lid for the casing positioned to cover adjacent portions of at least one of the hood and the windshield wipers when the airbag is inflated and the lid opens for smooth airbag deployment along the exterior of the motor vehicle, wherein the lid includes a frangible portion and a pivot portion with the lid breaking at the frangible portion and pivoting open about the pivot portion when the airbag is deployed.

11. An airbag device for being deployed along the exterior of a motor vehicle having a hood and a windshield including wipers associated therewith, the airbag device comprising:
    an airbag;
    a gas generator for inflating the airbag;
    a casing for the airbag mounted to the motor vehicle; and
    a lid for the casing positioned to cover adjacent portions of at least one of the hood and the windshield wipers when the airbag is inflated and the lid opens for smooth airbag deployment along the exterior of the motor vehicle, wherein the lid includes a pair of pivot portions and a frangible portion therebetween such that the lid breaks at the frangible portion and one portion of the lid pivots open about one of the lid pivot portions and covers adjacent portions of one of the hood and the windshield wipers, and another portion of the lid pivots open about the other lid pivot portion and covers adjacent portions of the other of the hood and the wipers.

12. An airbag device for being deployed along the exterior of a motor vehicle having a hood and a windshield including wipers associated therewith, the airbag device comprising:
    an airbag;
    a gas generator for inflating the airbag;
    a casing for the airbag mounted to the motor vehicle;
    a lid for the casing positioned to cover adjacent portions of at least one of the hood and the windshield wipers when the airbag is inflated and the lid opens for smooth airbag deployment along the exterior of the motor vehicle; and
    guide structure between the lid and the casing to cause the lid to shift away from the casing prior to opening when the airbag is deployed.

13. The airbag device of claim 12 wherein the lid is generally disposed below one of the hood and the windshield wipers prior to airbag deployment and the guide structure includes vertical guides that cause the lid to shift upwardly to a position generally aligned with or above the one of the hood and the wipers with airbag deployment.

14. The airbag device of claim 12 wherein the lid includes a guide member and the casing includes a slot opening in which the guide member is received and a frangible portion for restraining the guide member at an upper position in the slot opening prior to airbag deployment to minimize shifting of the lid during motor vehicle operations with the frangible portion breaking during airbag deployment to allow the lid to shift away from the casing with the guide member shifting in the slot opening away from the upper position therein.

15. An airbag device for being deployed along the exterior of a motor vehicle, the airbag device comprising:
 an airbag;
 a gas generator for inflating the airbag;
 a casing for the airbag mounted to the motor vehicle; and
 a lid for the casing positioned and configured to cover adjacent edge portions or projections exposed on the vehicle exterior when the airbag is deployed and the lid opens for smooth airbag inflation and deployment along the exterior of the motor vehicle, wherein the position of the lid is recessed from an exterior surface of the vehicle and the lid and casing include an attachment therebetween that allows the lid to advance beyond the vehicle exterior surface with airbag deployment before opening of the lid.

* * * * *